US012752294B2

(12) United States Patent
Covey et al.

(10) Patent No.: US 12,752,294 B2
(45) Date of Patent: Oct. 6, 2026

(54) VOLUMETRIC MEASUREMENT OF MICRO DROPLETS

(71) Applicant: DH Technologies Development Pte. Ltd., Singapore (SG)

(72) Inventors: Thomas R. Covey, Newmarket (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 139 days.

(21) Appl. No.: 18/774,553

(22) Filed: Jul. 16, 2024

(65) Prior Publication Data

US 2025/0018412 A1 Jan. 16, 2025

Related U.S. Application Data

(63) Continuation of application No. 16/973,801, filed as application No. PCT/IB2019/054883 on Jun. 11, 2019, now Pat. No. 12,036,568.

(Continued)

(51) Int. Cl.
*B05B 12/00* (2018.01)
*B05B 12/08* (2006.01)

(Continued)

(52) U.S. Cl.
CPC .......... *B05B 12/004* (2013.01); *B05B 12/082* (2013.01); *G01F 22/00* (2013.01);

(Continued)

(58) Field of Classification Search
CPC ..... B05B 12/004; B05B 12/082; B05B 17/06; G01F 22/00; G01F 13/00; G01F 13/008; G01F 25/0084; H01J 49/0031; H01J 49/165; H01J 49/0404; H01J 49/0445; B01L 3/50851; B01L 2200/143;

(Continued)

(56) References Cited

U.S. PATENT DOCUMENTS 6,612,149 B2 * 9/2003 Wang .................... G01D 18/00 73/1.02
6,719,449 B1 * 4/2004 Laugharn, Jr. ......... C12M 35/04 366/127

(Continued)

FOREIGN PATENT DOCUMENTS

CN 101019066 A 8/2007
CN 102175750 A 9/2011

(Continued)

OTHER PUBLICATIONS

European Communication pursuant to Article 94(3) EPC in Application 19819933.3, mailed Jul. 16, 2025, 7 pages.

(Continued)

*Primary Examiner* — Donnell A Long
(74) *Attorney, Agent, or Firm* — Lathrop GPM LLP; Malaika O.D. Tyson; Jason Kuchar

(57) ABSTRACT

Improvements in acoustically dispensed samples that are injected into an open port probe (OPP) are described. Apparatus and method are described that calibrate the volume dispensing determination and mechanisms in the acoustic dispenser to produce accurate and precise volumetric delivery.

17 Claims, 21 Drawing Sheets

Related U.S. Application Data

(60) Provisional application No. 62/800,936, filed on Feb. 4, 2019, provisional application No. 62/683,210, filed on Jun. 11, 2018.

(51) Int. Cl.

| | |
|---|---|
| ***B05B 17/06*** | (2006.01) |
| ***G01F 22/00*** | (2006.01) |
| ***H01J 49/00*** | (2006.01) |
| ***H01J 49/16*** | (2006.01) |

(52) U.S. Cl.
CPC ........ *H01J 49/0031* (2013.01); *H01J 49/165* (2013.01); *B05B 17/06* (2013.01)

(58) Field of Classification Search
CPC ....... B01L 2200/148; B01L 2400/0436; B01L 2400/0487; B01L 3/0268; G01N 30/72; G01N 30/86
See application file for complete search history.

(56) References Cited

U.S. PATENT DOCUMENTS

| | | | | |
|---|---|---|---|---|
| 7,338,802 | B2 * | 3/2008 | Frischauf | G01N 33/4915 73/1.01 |
| 7,661,289 | B1 | 2/2010 | Jhutty | |
| 9,153,425 | B2 | 10/2015 | Van Berkel | |
| 9,632,066 | B2 | 4/2017 | Van Berkel | |
| 9,664,647 | B2 | 5/2017 | Morris et al. | |
| 11,040,341 | B2 * | 6/2021 | Forbush | B01L 3/0268 |
| 12,036,568 | B2 | 7/2024 | Covey et al. | |
| 2003/0119193 | A1 | 6/2003 | Hess et al. | |
| 2007/0164231 | A1 | 7/2007 | Truche | |
| 2009/0007625 | A1 * | 1/2009 | Ao | G01F 1/668 702/100 |
| 2009/0126516 | A1 * | 5/2009 | Yamamoto | B01F 33/3021 73/864.22 |
| 2015/0048255 | A1 | 2/2015 | Jarrell | |
| 2016/0172178 | A1 | 6/2016 | Apffel | |
| 2016/0181082 | A1 | 6/2016 | Covey et al. | |
| 2016/0299041 | A1 | 10/2016 | Kertesz | |
| 2017/0125222 | A1 | 5/2017 | Brown | |
| 2017/0243729 | A1 | 8/2017 | Morris et al. | |
| 2018/0350578 | A1 | 12/2018 | Yip | |
| 2019/0157061 | A1 | 5/2019 | Datwani | |

FOREIGN PATENT DOCUMENTS

| | | | |
|---|---|---|---|
| JP | 2006-502413 | A | 1/2006 |
| JP | 2006-208379 | A | 8/2006 |
| JP | 2010-194396 | | 9/2010 |
| JP | 2016-533010 | A | 10/2016 |
| KR | 10-1089328 | | 12/2011 |
| WO | 2016/164766 | | 10/2016 |
| WO | 2019/104235 | | 5/2019 |
| WO | 2020/157736 | | 8/2020 |

OTHER PUBLICATIONS

European Extended Search Report in Application 19819933.3, mailed Feb. 10, 2022, 8 pages.
PCT International Search Report and Written Opinion in Application PCT/IB2019/054883, mailed Nov. 13, 2019, 9 pages.
PCT International Preliminary Report on Patentability in Application PCT/IB2019/054883, mailed Nov. 13, 2019, 8 pages.

* cited by examiner

Fluid vortex sweeps droplet away on contact with the circulating liquid

Acoustic dispensing in non-contact

Illustration of the reason the ADD-OPP system has zero carry-over.

VOLUMETRIC MEASUREMENT OF MICRO DROPLETS

CROSS-REFERENCE TO RELATED APPLICATIONS

This application is a continuation of U.S. patent application Ser. No. 16/973,801, filed Dec. 10, 2020, which is a National Stage Application of PCT/IB2019/054883, filed Jun. 11, 2019, which claims the benefit of U.S. Provisional Patent Application No. 62/800,936, filed Feb. 4, 2019 and U.S. Provisional Patent Application No. 62/683,201, the entire disclosures of which are incorporated herein by reference in their entireties. To the extent appropriate, a claim of priority is made to each of the above disclosed applications.

FIELD

This application relates to the field of micro droplets. In particular, this application relates to a system and method for measuring the volume of dispensed micro droplets using mass spectrometry.

BACKGROUND

Microfluidic dispensing pertains to the control and manipulation of fluids to extract a small volume of fluid from a bulk fluid sample for examination. Microfluidic dispensing emerged in the early 1980s and has been used in a diverse range of fields such as inkjet printing, DNA microarrays, lab-on-a-chip technology, 3-D printing heads, microtiter plate replication and reformatting of pharmaceutical drug libraries, dispensing of individual cells and cell lysates, among other fields.

Microfluidic dispensing has continued to grow and evolve and now is capable of dispensing smaller and smaller volumes of fluids, often via methods that deliver highly precise volumes via non-contact methods. Microfluidic dispensing is particularly useful in fields where reagents are costly or available in limited quantities as well as applications where high speed and throughput is desirable. By way of example, drug development and discovery including high throughput screening (HTS) and the characterization of the pharmacologically relevant administration/distribution/metabolism/excretion (ADME) properties have embraced microfluidic dispensing for these reasons as have fields related to next-generation gene sequencing. More recently the inventors have been incorporating microfluidic dispensing technology to introduce samples to analytical measurement tools such as mass spectrometers.

The basic operation of microfluidic dispensing involves the separation of a small volume of sample material from a relatively larger "bulk" sample. The sample material may be dispensed in different forms, for instance, as a single discrete droplet, group of droplets, mist, or other physical arrangement of the sample material. Depending upon the specific mechanism used to separate the sample material different dispensed forms may be more or less reproducible with each dispensation.

Dispensation by droplet, for instance, has been used to dispense discrete droplets as small as the picoliter range. Some of the most common types of systems for delivering low volume droplets from samples are broadly characterized as jetting or dynamic devices, examples include, for instance: acoustic technology; piezoelectric technology; pressure-driven technology; air-driven pump/valve technology; electric field driven technology; etc. These dispensation devices all transfer a measured amount of energy that is directed into the bulk sample in order to break a desired sample volume from the bulk sample fluid in the form of a droplet or droplets.

The amount of energy required to dispense a droplet from a bulk sample fluid is related to the fluid properties of the bulk fluid, with viscosity and surface tension being the primary considerations. The dispensation parameters that control the energy generated and transferred by a dispensation deice into the bulk sample fluid need to be specifically tailored to the fluid properties of a bulk sample fluid in order to deliver a targeted droplet volume that is sufficiently energized to break free from that bulk sample fluid.

Due to the complexity of the problem, the selection of specific dispensation parameters that correspond to a desired droplet volume for a given bulk sample fluid is achieved by an empirical tuning process of one or more dispensation parameters, dispensing one or more droplets, measuring the dispensed volume of the one or more droplets, adjusting a dispensation parameter, and iteratively repeating the sequence until dispensation parameters are identified that consistently deliver the desired droplet volume for the bulk sample fluid. Regardless of the dispensation technology used, the dispensation parameters are often mutually dependent, making this tuning process highly parametric as adjustment of one dispensation parameter may affect the tuning of other dispensation parameters.

Acoustic droplet dispensing is commercially used for transferring liquid samples from one microtiter plate to another, so called plate replication and reformatting. Dispensers are also being developed to transfer samples from test tubes of various configurations into microtiter plates. The inventors are using acoustic droplet dispensing to direct samples of controlled volume into a capture probe for collection and transfer for mass analysis by a mass spectrometer.

As an example of liquid dispensing, acoustic droplet dispensing (ADD) is a technique used to transfer, contact free, volumetrically accurate and precise droplets from sample wells in a microtiter plate to a corresponding sample well in a second microtiter plate. The use of energy in the form of sound waves allows for the transfer of fluids in the form of discrete droplets to be contact free, volumetrically accurate, and precise when conditions are highly controlled. Typical well densities in the microtiter plates are 96, 384, and 1536 wells per microtiter plate and typical droplet volumes for dispensation are in the 1-20 nL range.

Larger volumes than 20 nL can be dispensed with the expectation that fragmentation of these droplets will occur after desorption due to fluid instabilities. Multiple droplets can be sequentially dispensed to a target well to accumulate to reach a desired dispensing volume. Pharmaceutical research and development organizations use this method extensively to dispense small volumes of compounds, typically dissolved in dimethyl sulfoxide, from their large drug libraries to be further tested in HTS assays screening for biological activity and ADME assays determining pharmacological properties.

Acoustic dispensers, for instance, create sound waves by a piezoelectric vibrator energized with RF power and transferred through a metallic lens to the bottom of a sample well through a coupling fluid. A coupling fluid is used to connect the metallic lens to the bottom of the sample well as Air gaps must be avoided as sound waves rapidly decelerate through gaseous medium. The sound waves propagate through the bottom of the sample well, which can be composed of a variety of compatible plastics or other materials as well as having a wide range of thicknesses and shapes, then travel through the fluid of the sample to the meniscus at the surface. At this point a pressure disturbance occurs as the sound waves decelerate at the liquid-gas interface which will, under the proper conditions accurately launch a droplet of a known volume in a precise and reproducible manner several centimeters above the surface.

Operation of other droplet dispensers, such as pneumatic or pressure-based droplet dispensers may similarly vary in droplet dispensation based on the physical parameters of a liquid sample being dispenses.

Operation of a dispenser may be controlled by adjusting a number of physical parameters that are germane to that dispenser-type. For instance acoustic dispensers may vary frequency, power, direction, duration or burst rate, focusing location, etc. in order to generate the droplet from the liquid sample. Determining what values to use for these physical parameters in setting the operational parameters of a dispensing device to repeatedly deliver the desired droplet volume from liquids with different fluid properties and depths is a process referred to as calibration. Variations in the sample, plate and environmental properties necessitate the adjustment of the physical parameters to compensate. Determining what values to use for the physical parameters to deliver the desired droplet volume is a process referred to as "calibration".

In the case of acoustic dispensers, for instance, calibration of the acoustic parameters is required in order to reproducibly dispense accurate and precise droplet volumes. Droplet volume measurement is central to the calibration process. Samples with different fluid properties require unique calibration files and unique calibration files are required at different depths of a sample. The sound wave frequency, power, energy duration (repetition or burst rate), focus point, and the individual characteristics of the piezo transducer and lens elements in an instrument all affect the volume of the dispensed droplet. The value of these parameters to deliver a specified droplet volume depends strongly on the viscosity and surface tension properties of the bulk solution. For this reason, calibration files are required for different liquids having different viscosities. Calibration files may also be required for different depths of a particular fluid in a sample well because the energy dissipates as it travels through the fluid to the surface where the energy is deposited to launch the droplet. The calibration files are specific to each individual instrument due to variations in the manufacturing of the piezoelectric transducers and the associated lens assembly.

Calibration is a multistep iterative process which involves adjusting the physical parameters (e.g. acoustic power, frequency, repetition or "burst" rate, and focus of the waves with a lens to a point near the surface of the sample liquid). Their values are affected by the viscosity of the sample fluid which will alter the surface tension of the sample liquid thus the power required to launch a droplet. Variations in the sample, plate and environmental properties necessitate the adjustment of the physical parameters to compensate.

After each volume measurement the physical parameters of acoustic power, frequency, and repetition or "burst" rate are iteratively adjusted and the volume measurement repeated. The closer one gets to the correct volume the less adjustment is required. Eventually only one parameter needs fine tuning with all the others remaining at a fixed value reducing the parametric nature of the process. Some methods provide for keeping frequency and power fixed and only adjusting burst rate and focus distance but all these parameters could be adjusted to achieve the targeted droplet volume.

In addition, the distance the waves must travel to the surface will affect the position of the focal point of the waves which is controlled by positioning the focusing lens. The distance is a function of the volume of sample in the well which can change over time as the sample is dispensed, evaporates, or varies on a sample to sample basis due to the nature of the assay. This distance must be accurately determined for each well and adjusted for by the lens position. This is done by measuring the time it takes for a reflection of a sound wave to return to the piezoelectric emitter which also serves as a detector. The distance to the surface can then be calculated if the speed of sound in the sample fluid is known. For many types of fluid mixtures, the speed of sound is unknown so must be measured by the instrument. Determining the speed of sound in any sample fluid is the first step of the calibration process. Once this is determined for a known bulk sample composition the data is stored and used to determine the fluid depth in all wells to be analyzed. Once the speed of sound is determined in a particular fluid it does not have to be repeated.

Conventional calibration operations are typically done at the factory or in the field by service engineers employing a series of iterative protocols, standardized reference solutions of UV adsorbing compounds or light emitting fluorophores, and spectrophotometers measuring the transmission, adsorption, or emission of light to determine the concentration of the dispensed droplets which can be converted to droplet volume. A predetermined number of droplets are fired from a sample including light emitting or adsorbing reference solution, typically 10-200 droplets, then the sample is diluted to a known volume, much greater than the summed volume of the droplets, and the concentration is determined with a spectrophotometer. When acoustic dispensing is used for plate replicating or reformatting applications, calibration has generally not been a problem because the sample fluid composition is well defined and uniform, commonly 100% DMSO and seldom anything else. The concentration of pharmaceutical library compounds in this solvent is not high enough to substantially affect the fluid viscosity.

In cases where fluid composition is not well defined and may vary between samples, the parameters used to create new calibration files may need to be empirically determined each time a sample having sufficiently different fluid properties is encountered. Small variations can have a large effect for example plasma from different patients or samples from fermentation media taken at different times of the incubation due to the fluid properties introduced by the biological solutes in the aqueous solvent. Samples having different solvent proportions need different calibration files, for example different combinations of alcohols and water. Variations of a few percent can require different calibration files. Commercially available acoustically dispensed plate replicator instruments provide calibration files that have been established at the site of manufacture for a limited number of liquids.

New calibration files are also required when different types of sample plates are used having different material compositions and dimensions, the thickness and composition of the bottom of the well where the sound waves traverse are particularly important. In addition, separate calibration files are required at different depths of fluid within a well. Typically, for some dispensers, 100 separate calibration files will be recorded at different depths of the fluid in a 384 plate well.

Calibration files are stored, reused, and do not have to be replaced on an instrument as long as the sample composition and plate type remains constant. Every instrument will have unique settings due to slight differences in the piezoelectric generator and the metal (typically aluminum) transmitting/focusing lens.

In situations where sample compositions can vary widely and are unpredictable, the calibration problem is a serious obstacle.

SUMMARY

Embodiments of the present application relate to the field of droplet generation and analysis where measured liquid samples may be dispensed from a bulk liquid in the form of small sample droplets and the volumes of each of the individual liquid sample droplets needs to be accurately determined. In some embodiments the volume determination may be used to calibrate a droplet generator that dispenses the sample droplets from the bulk fluid. In some embodiments the droplet generator may be calibrated to provide consistent, repeatable droplet dispensation Accurate and precise volume measurements are required for droplets destined to be used for additional sample manipulation, for deposition on surfaces, and for analytical measurements on the components of the droplets.

In some embodiments a method and apparatus is provided for calibration of an acoustic droplet dispenser for accurate and precise volumetric delivery of droplets.

For this reason, a system that can accurately measure the droplet volumes in a real time manner for the purpose of quickly calibrating the deposition parameters is highly desired. This is particularly important for biological samples where the fluid properties can change in unpredictable ways on a per sample basis. For applications where the gravimetric mass of the solutes are being measured in a droplet from a sample a means to simultaneously determine the volume of that droplet is required in order to know its concentration.

In some embodiments, a method is provided for calibrating a droplet dispenser dispensing sample droplets from a liquid sample, comprising: providing a liquid sample including a calibrant of known calibrant concentration; dispensing a droplet of assumed droplet size from the liquid sample; ionizing the droplet of assumed droplet size; measuring a calibrant mass of calibrant in the ionized droplet using a mass spectrometer; and, determining an actual droplet size by comparing an expected calibrant mass based on the assumed droplet size with the measured calibrant mass.

In some aspects, the method may include determining that the actual droplet size varies from the assumed droplet size by greater than a threshold size; and, adjusting at least one droplet dispenser parameter of the droplet dispenser based on at least one of the magnitude and sign of the droplet size variance. In some aspects, the method may include repeatedly dispensing a subsequent droplet of subsequent assumed droplet size from the liquid sample using the previously adjusted at least one droplet dispenser parameter, ionizing the subsequent droplet, measuring a subsequent calibrant mass of calibrant in the ionized subsequent droplet, determining an actual subsequent droplet size by comparing an expected subsequent calibrant mass based on the assumed subsequent droplet size with the measured subsequent calibrant mass, and adjusting the at least one droplet dispenser parameter of the droplet dispenser until the actual subsequent droplet size varies form the assumed droplet size by less than the threshold size.

In some embodiments, a system is provided for measuring a volume of fluid dispensed by a fluid dispenser, the system comprising: a capture probe for receiving and capturing a dispensed volume of fluid from the fluid dispenser, the dispensed volume of fluid including a calibration standard; an ionization source for ionizing the captured volume of fluid; and, a mass spectrometer for measuring a mass of the calibrant contained in the ionized volume of fluid.

In some aspects the system further comprises a reference compound of known concentration introduced into a transport fluid of the capture fluid.

In some aspects the system is further operative to determine a measured volume of the fluid based on the mass of the calibrant.

In some aspects, the system is further operative to determine the measured volume of the fluid based on a ratio of the measured mass of the calibrant and measured amount of the reference compound.

BRIEF DESCRIPTION OF THE FIGURES

The skilled person in the art will understand that the drawings, described below are for illustration purposes only and are not intended to limit the scope of the present teachings in any way.

DETAILED DESCRIPTION

Figure 1A:
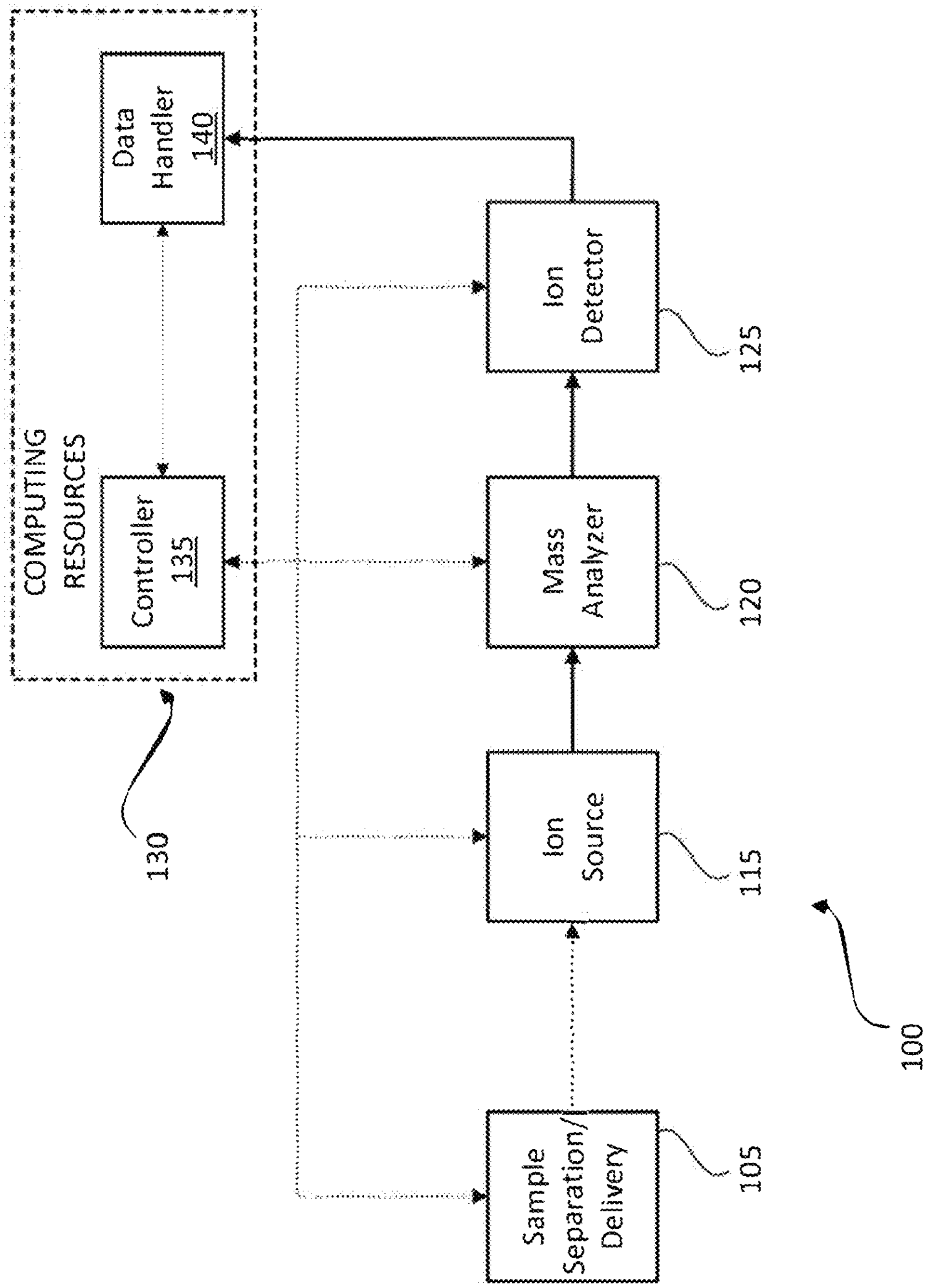
FIGS. 1A and 1B are schematics of embodiments of the present teachings.

In some embodiments systems and methods are presented for dispensation of sample droplets from a bulk sample fluid and volumetric measurement of the dispensed droplets. In a number of fields the accurate and precise volume measurements are required for droplets destined to be used for additional sample manipulation, for deposition on surfaces, and for analytical measurements on the components of the droplets.

For purposes of illustrating the above noted problems the present application describes an implementation with acoustic based non-contact dispensers in detail. While the present application and examples are predominantly directed towards implementations employing acoustic microfluidic dispensation devices, the application contemplates a wide variety of dispensation technologies including, without limitation, acoustic technology; piezoelectric technology; pressure-driven technology; air-driven pump/valve technology; and, electric field driven technology.

In some embodiments, systems and methods are presented for accurately and precisely measuring the volumes of individual liquid droplets in the picoliter to microliter range. In some embodiments, the systems and methods may include capturing micro-dispensed droplets in a flowing stream of liquid and transporting them to an atmospheric pressure ion source of a mass spectrometer for measurement. By determining the gravimetric mass of calibration and reference compounds in the droplets and transport fluid the volumes of each droplet can to be determined. The measurement is fast enough for real time volume measurement to occur when droplets are dispensed at rates as high as 10 Hz. The systems and methods may be operated independent of solvent and sample composition and are applicable to biological fluids from a wide variety of sources.

The method invention described herein involves determining and calibrating the volume of dispensed droplets using a mass spectrometer to measure the gravimetric mass of a reference standard added to the samples at a known concentration. Calibration parameters can be adjusted each time a droplet is fired, and its volume measured by the mass spec followed by parameter adjustment to bring them to the targeted value. Since the mass spectrometer is also the analytical measurement tool, calibration can be done on each sample prior to the analytical measurement if this is required in situations where sample viscosities are highly unpredictable as noted with the fermentation example, otherwise referred to as "calibration on the fly". If the calibration parameters are only slightly off resulting in small deviations from the targeted dispensed volume, an alternative to recalibrating each sample is to measure the volume with the mass spectrometer during the analytical measurement, record the slight volume discrepancy, and account for it in subsequent concentration calculations.

Embodiments described herein may be implemented using a capture probe as an interface to the mass spectrometer in order to capture dispensed droplets for volume measurement. An example of a suitable capture probe includes the "Open Port Probe" (OPP) which is the topic of several Sciex licensed patents and has successfully been used to capture dispensed droplets for analytical measurement. See, for instance, U.S. Pat. No. 9,632,066 BS-Open Port Sampling Interface, US 2016/0299041 A1-Capture Probe, and U.S. Pat. No. 9,153,425 B2-Device for High Spatial Resolution Chemical Analysis of a Sample and Method for High Spatial Resolution Chemical Analysis, all incorporated by reference. This invention describes a new use for capture probes including the OPP.

In some embodiments, the capture probe may be modified to introduce an internal standard to the transport fluid. The response ratio between the reference standard in the sample and the internal standard in the transport fluid can be used to calculate the mass of the reference standard in each droplet thus its volume. The response ratio will remain constant and not be subject to drift as the mass spectrometer performance changes over time. This negates the requirement to construct calibration curves of reference standard concentration vs MS response (peak area) used to calculate the droplet volumes on a continuing basis. This approach using an internal standard in the transport fluid also improves measurement accuracy.

The ability to rapidly determine the volumes of individually dispensed droplets provides a means of accurately and precisely determining the concentration of solutes in a sample when the gravimetric mass of those solutes is determined by a mass spectrometer. It also provides a means of calibrating droplet dispensers and the system is appropriate for a wide variety of droplet generators. This is particularly important when the fluid properties of samples to be dispensed are unpredictable and require a recalibration of the dispenser's parameters on a real time basis. It is also important when measurements are to be made on the components within the droplets and the concentration of those components in the droplets needs to be determined.

Unlike plate replicating, acoustic dispensing as a means of introducing samples into a mass spectrometer for analytical measurements may encounter samples of different and often unknown composition thus viscosities. Since mass spectrometry is an analytical measurement tool for a wide variety of applications and sample types, as opposed to a plate replicating tool, it would be advantageous to have a means to rapidly and automatically adjust the physical parameters as needed on a per sample basis. We refer to this ability to calibrate on a per sample basis as "calibration on the fly".

In particular, it is proposed by the inventors to use acoustic dispensing for biological and fermentation products which may widely vary in composition from sample to sample. Examples of situations where the sample composition will vary are widespread. Samples to be dispensed may come from preparation protocols involving liquid-liquid or solid phase extraction techniques which involve extraction fluids having different concentrations of alcohols, acetonitrile, or solvents immiscible in water such as chloroform or hexane. Protein precipitation in blood plasma samples is common and involves adding substantial quantities of organic solvent to the aqueous medium to cause the proteins to drop out of solution. In situations like these some understanding of the resulting solvent composition is understood and predictable to some degree, nevertheless a calibration procedure for these wide variety of media must be made accessible to the user.

Situations where the sample composition, thus viscosity, can change radically in an unpredictable manner are common. The monitoring of the biochemical reaction products from mammalian, yeast, and bacterial cell cultures is an example. During the change in the life cycles of the cells the media changes in its bulk chemical composition substantially. It has been reported that the media present at the beginning and end of a fermentation or incubation time can be acoustically dispensed but dispensing fails during the middle time periods. It appears that an abundance of complex carbohydrates is produced during these failure periods resulting in a sufficiently high viscosity change to render the original calibration parameters inadequate. The only way to deal with this type of situation is "calibration on the fly".

Typically, a spectrophotometer is used to measure the transmission, adsorption, or emission of light from dispensed calibration compounds of a known concentration. It utilizes standardized reference solutions with a known concentration of UV adsorbing or light emitting fluorophore calibration compounds dissolved in the sample solvent or matrix to be calibrated.

Since spectrophotometers are concentration sensitive detectors they measure the concentration of the dispensed sample using, for example, the relationship expressed in the Beer Lambert Law. The procedure involves dispensing a predetermined number of droplets in a well, typically 100-200, and subsequently diluting the aggregate collection of drops in the well with a known volume of diluent. The diluent is in far excess of the accumulated droplets to make the measurement possible with a spectrophotometric based plate reader. In some cases, a pipetting error may be introduced at this point into the measurement.

As may be apparent from this description, the conventional spectrophotometric calibration protocol measures an average volume from the collection of droplets and accordingly does not measure individual droplet volumes.

An accurate accounting of the total volume of the droplets plus diluent is required in order to be able to calculate the volume of the accumulated droplets. An additional error is introduced using this method because it assumes the total volume is equal to the volume of the added diluent. This is because the volume contributed by the droplets is unknown as the system is not yet calibrated. This error is minimized if the volume of the diluent is much larger than that of the dispensed droplets but is an error nonetheless. This source of error can theoretically be eliminated if the volume of the bulk solution, i.e. the total volume of dispensed droplets plus diluent, were brought up to a known volume, rather than by adding a known volume of diluent but this can be cumbersome requiring capturing the droplets in a vial with an accurate volume measurement marking, variations in the position of the marking and the sighting of the liquid meniscus to it being a large source of error. As the calibration proceeds, each step is repeated and the targeted droplet volume is gradually converged upon, thus reducing this source of error because the total volume can be more accurately determined as the volume of diluent plus the volume of the dispensed droplets.

A means to avoid both these sources of error, and the time it takes to correct for them by performing iterative repeat calibrations, is to measure the mass of the calibration compound in each droplet directly to calculate the droplet volume from a known calibrant concentration. This is not possible with the spectrophotometric approach. The proposed mass spectrometry-based calibration system measures the mass of the calibration compound in each droplet directly.

The spectrophotometric determination of the concentration of the accumulated droplets diluted to a larger volume requires the construction of a standard curve prepared from known concentrations of the dye. Although the dispensed sample is substantially diluted it is best practice to prepare different calibrant concentrations in the same solvent as the unknown being measured. This is because attenuation or amplification to the emission or absorbance of light by the components in the sample can occur. Quenching phenomena will attenuate the signal, luminescence phenomena will amplify the signal both of which will alter the equation of the line of the standard curve.

For this reason, new standard curves are required for each new each liquid type and sample matrix that is to be calibrated. This adds to the time and labor involved and stands in the way of the process being automated for rapid calibration on a sample by sample basis. The proposed mass spectrometry-based calibration system introduces the concept of a master standard curve that conveniently provides a single standard curve that may be used to calculate droplet volumes irrespective of sample type or volume to be dispensed.

The spectrophotometric determination of the concentration of the dye in the total diluted sample allows one to calculate the mass of the calibrant dispensed to achieve this concentration value. Knowing the original concentration of the calibrant in the dispensed droplets, the accumulated volume of the dispensed droplets can be calculated. The calculated accumulated volume divided by the number of droplets dispensed provides the average droplet volume. This value provides no indication of the volume variation within that population of dispensed droplets. If repeated measurement provides the same average value, there is still no indication of the within run error. Droplets could be both large and small around the mean.

The present mass spectrometry-based calibration system measures the volume of each individual droplet immediately upon dispensing providing an accurate assessment of the per droplet variability and a means to correct for it.

The depth of the fluid in a well may be determined rapidly as described below. The method is based on the principles of sonar.

The time and effort required to calibrate of the task increases exponentially when, for a single sample type, it is understood that different calibration files are needed for different liquid levels within a well. The energy of the sound waves dissipates as they travel through the fluid so increasing the power and/or duration of the sound waves is required as the depth increases. The power is tuned by varying the voltage applied to the transducer or alternatively the length of time that energy is deposited into the surface sometimes referred to as burst rate. Since the surface momentarily stores the energy deposited, a longer time will deposit more energy. In practice both voltage and burst rate are fine tuned to provide the power to achieve the targeted volume.

Typically, as many as 100 separate calibration files are required for as many depth locations in a 384 well plate. Since at each liquid level the calibration procedure outlined above is evoked, i.e. 100-200 droplets are dispensed collected, diluted and measured for their concentration by fluorescence between each iteration of acoustic parameters, there is an inherent quantum mechanical problem, i.e. the measurement distorts what is being measured. Calibrations at different depths are attempting to be established while at the same time the depth is changing altering the calibration parameters. The droplet volume measurement reduces the liquid level a sufficient amount over 100-200 dispensed droplets to require a different power setting at the beginning then at the end of the dispensing series. To correct for this the calibration procedure at each level is repeated several times to average out the errors.

The present mass spectrometry-based calibration system avoids the quantum mechanical problem because volume measurements and parameter adjustments are performed on individual nanoliter sized droplets. Liquid level changes because of a single drop are negligible.

Acoustic droplet dispensing requires that the depth of the liquid to be dispensed can be measured quickly and dynamically for both calibration purposes and for the routine dispensing of samples. Measuring the depth does not require dispensing a drop thus does not involve measuring the volume of emitted drops. Thus, the procedure for measuring the depth is the same irrespective of the approach taken to measure and calibrate the droplet volumes. This aspect of calibration or routine dispensing is the same with either the spectrophotometric or mass spectrometric approach to droplet volume measurement described. However, there are advantages to the mass spectrometric approach when considering the liquid depth versus liquid volume relationship in sample wells, so a detailed description of depth measurement is included below.

Liquid levels may vary in each sample well due to depletion from dispensing, evaporation, or sampling methodology thus, in normal laboratory operation, the volumes of the samples in each well can vary significantly. The knowledge of the distance to the meniscus is required to set the focal point of the sound waves at or near the surface to within a few hundred microns to concentrate the energy at the point of droplet launch for each sample. Acoustic power requirements also increase with increasing depth. Therefore, a depth measurement is required for each sample well to allow for the lens on the acoustic transducer assembly to be mechanically positioned to the proper focal distance before the dispensing event and for the correct acoustic calibration file to be invoked. This approach requires that the speed of sound through the sample liquid and the bottom of the plate containing the liquid be determined or known. The speed of sound may be measured directly by calculating the time it takes for a sound wave to reflect from the surface back to the piezoelectric transmitter, which also serves as a sound wave detector.

The depth of the fluid in a sample well must be determined for two reasons.

Firs, different calibration files are typically required for different liquid depths, depending upon typical depth variation. For example, calibration files after every 200 nL of fluid dispensed from a 384 well density plate are typically done. This would amount to approximately 100-200 calibration files per well to cover the full range of possible fluid depths in a sample well. Since the power of the sound waves gradually dissipates as they traverse the fluid, delivering the same power to the surface at different fluid depths requires higher energies for greater depths. The power is tuned by varying the voltage applied to the transducer or alternatively the length of time that energy is deposited into the surface sometimes referred to as burst rate. Since the surface momentarily stores the energy deposited, a longer time will deposit more energy. In practice both voltage and burst rate are fine tuned to provide the power to achieve the targeted volume but as the correct values are converged upon one parameter can remained fixed while the remaining one is used to fine tune the settings.

Second, lens focusing is required for different liquid depths for routine sampling. To effectively eject a sample droplet the calibrated sound waves need to be focused with a lens to a point at or near the surface of the sample liquid, typically within a few hundred microns of the surface. Focusing the sound waves to a point 200 μm above the surface is common practice. The focal point is controlled by the physical position of the focusing lens. The distance is a function of the volume of sample in the well and the well geometry. The fluid level of a sample can change over time as the sample is dispensed, evaporates, or varies on a sample to sample basis due to the nature of laboratory operation. This distance must be accurately determined for each well and adjusted for by the lens position. This can be determined immediately before each sample is dispensed or may be performed as a batch mode by sequentially processing all of the sample wells in a plate prior to dispensing from a selected one or more wells.

Depth measurement is performed by measuring the time it takes for a reflection of a sound wave, delivered up through the bottom of the sample well, to return to the piezoelectric transducer which serves as both the emitter and detector of the sound waves. Reflections of a portion of the emitted sound waves occurs at each point where the transmitting medium changes state, from solid to liquid to gas. A reflection occurs from the bottom of the well plate, from the transition from the solid well plate bottom to the sample liquid, and from meniscus at the surface of the liquid sample where the most intense reflection is observed. This allows the speed of sound to be determined through both the plate bottom and the liquid sample when known plate bottom thicknesses and known liquid depths are tested.

Once the speed of sound is determined through a plate of a material and thickness those values remain constant for all plates of this type and the information is stored. Once the speed of sound is determined through a liquid medium then that remains constant for all samples of this bulk composition and the information is stored. The entire process, including the mechanical refocusing of the lens, takes on the order of tens of milliseconds which allows for this measurement to be done on every sample well prior to dispensing.

Plate replicator applications typically encounter a limited number of different solvent types, 100% dimethyl sulfoxide being the most commonly used one to store pharmaceutical drug libraries, and accordingly the speed of sound through the sample is typically consistent. Well-characterized plates are also the norm. Thus, the requirement to create large numbers of calibration files and to measure the speed of sound in many different systems is not extensive in this field of application.

Proposed applications involving the use of a mass spectrometer to analyze biological fluids and measure the quantity of compounds dissolved in them and to identify the compounds based on their molecular weights and their chemical bond fragmentation patterns is an entirely different matter. Almost an infinite number of samples with different fluid properties are encountered from biological and industrial processes, all requiring unique calibration files.

By way of example, the inventors have performed ADD-OPP on fermentation products collected over time during a fermentation process, and observed that the measurements are not consistent as the fluid properties change sufficiently during the fermentation to deviate from the assumed fluid properties of the calibration. Similar issues have arisen when measuring biological products such as blood serum where the acoustic droplet ejection may work for some samples, and show sufficient deviation to yield an erroneous measurement result for other samples.

In order to be comprehensive, the following is an example of a protocol to determine the speed of sound in the system and the depth of fluid in a well. To perform this protocol droplets are not dispensed, only the time for sound wave reflections from phase transitions are measured.

(a) Measure reflection times for a known sample volume (known distance or path length), sample composition where the speed of sound is known, and a plate for which this measurement has already been established. This establishes and checks baseline parameters.

(b) Measure reflection times for a known volume (e.g. of known depth and known path length for a given sample well geometry), known sample composition, and unknown plate. By comparing results from (a) and (b) this establishes the speed of sound and flight time of the sound waves through the bottom of this plate. This will remain constant with all remaining plates of this type, i.e. same manufacturer, same style (plate thickness), same material (type of plastic). This plate is now a known plate permanently recorded into a data base.

(c) Measure reflection times for known volume (e.g. known depth and known path length for a given sample well geometry), unknown sample composition, and known plate. By comparing results from (b) and (c) this provides the flight time of the sound waves through this depth of the new fluid thus the speed of sound in this medium. This will remain constant using this bulk composition of fluid from this point on. This depth measurement can now be done on every well followed by loading the correct calibration file, adjusting the lens position appropriately if required, and desorbing a droplet in a time frame of tens of milliseconds per well.

(d) Establishing the fluid volume vs fluid depth relationship of sample reservoirs. Different models and styles of well plates have different geometries of the sample reservoir which translates to different volumes of liquids occupying different depth levels of the liquid. This relationship between volume and depth is particularly important to know when the sample well is approaching the empty state. Knowing the volume remaining from a depth measurement allows one to know how many more droplets can be dispensed before the well is so close to empty that further dispensing is considered unreliable. In some embodiments, the proposed system may be operative to maintain an estimate of sample volume in each well, and to provide an indication if the estimated sample volume/fluid height for a particular well is too small (i.e. below a threshold value for that sample well geometry) to allow for an intended droplet ejection from that well.

After calibration parameters have been established to deliver reliable droplet volumes tables of this relationship may be prepared for different well plate designs. A defined number of droplets of known volume are dispensed and the depth is remeasured. The process is continued until the samples reaches its minimum viable volume for dispensing. Typically around 100 droplets are dispensed per depth measurement amounting to between 100-500 nl per level.

Since the present mass spectrometry-based calibration system measures the volume of each droplet accurately, establishing the fluid volume vs fluid depth relationship does not require that the system accurately dispenses a known volume per drop. Instead, the present mass spectrometry-based calibration system only requires counting the number of dispensed drops captured by the capture probe and measuring/confirming the volume of each droplet. Accordingly, the present mass spectrometry-based calibration system does not require a fully calibrated dispensing system to be in place in order to perform the fluid depth measurement.

The purpose of acoustically dispensing samples into a mass spectrometer system would be to achieve the following performance metrics.

1. High speed. To achieve sample introduction rates 10-100× faster than current HPLC methods. Speeds on the order of hundreds of milliseconds per sample are required.

2. Avoid errors due to cross contamination of samples. Free from direct sample contact to surfaces. "Contact free", for example by avoiding additional pipetting.

3. Consume small amounts of sample for a single analytical measurement (Low nanoliter volumes preferred).

4. Flexible control with regards to rate of sample introduction. Can extend per sample data acquisition time from hundreds of milliseconds to tens of seconds depending on the requirements of the mass spectrometric measurement.

5. Robust and reliable. Will be able to sustain high speed sample introduction rates for long periods of time without failure. Capable of continuous operation of at least 100,000 samples per day.

6. No requirement for sample pre-purification. Direct analysis of blood, plasma, fermentation media, etc. possible, though this may introduce new sensitivity limits.

7. Quantitatively precise and accurate. Coefficients of variation in the volumes dispensed and the variability of the mass spec signal<10% in total.

8. Low limit of detection and quantitation. Low nM. Low parts per billion.

9. Applicable to a broad range of chemical species. Molecules ranging in molecular weights from <50 amu to over 100,000 amu.

10. Accept a wide variety of sample fluids whose properties are not predictable nor necessarily known before the time of analysis. Aqueous and non-aqueous containing high concentrations of solutes that could alter the fluid properties such as proteins, polysaccharides, alcohols, etc. Acoustic dispensers need to be tuned or calibrated to do this on a per sample basis. In order to do this a means of measuring the per droplet sample volume during each dispense, or at least within a sampling period, is required.

Performance metrics 1-3. Acoustically driven plate replicator instruments have demonstrated the ability to dispense low nanoliter droplet volumes at several Hz without any direct physical contact to the sample. In order achieve the remaining six attributes the approach used to couple the acoustically generated droplets to the mass spectrometer ion source will come into play.

Performance metrics 4-9. An approach to transfer the acoustically generated droplets to an electrospray mass spectrometer ion source has been developed that transports the droplets through a liquid stream referred to as the Open Port Probe (OPP). This interface is described in more detail in WO 2019/104235 (PCT/US2018/062337), incorporated herein by reference. This interface with some additional modifications described below, achieves the above performance metrics 4-9, as is described in more detail below.

Performance metric 4. The OPP can transform the discrete digital signal from an acoustic dispenser into a continuous beam of ions by capturing and merging the individual dispensed droplets in the flowing solvent stream. This occurs when droplets are dispensed into the OPP at a rate of 10 Hz or greater for typical capture probe solvent flow rates/volumes. In so doing the sample introduction time can be adjusted to a mass spectrometer acquisition method. For example, signal averaging over longer periods of time can be used as a means to lower detection limits. Ion mobility separation coupled with MS/MS of all components in a complex biological sample using scan modes such as SWATH becomes practical with dynamic control over the sample introduction time. Small amounts of sample are consumed using acoustic droplet dispensing even over relatively longer periods of time. Furthermore, a range of well sizes may be accommodated, with larger well volumes supporting extended sampling periods from the well.

Performance metric 5. The OPP transport fluid is delivered using a gas pressure drop pump which, because it lacks any mechanically moving parts, is highly reliable. In addition, the apertures of the fluid transport tubes are large and inherently resistant to clogging.

Performance metric 6. The OPP dilutes the acoustically dispensed droplets>100 fold (or more) which allows sample purification steps to be avoided. The suppression of the electrospray ionization process does not occur when samples are diluted to this extent and the dilution is instantaneous after sampling and before ionization. Blood samples can be directly injected, and biochemical reactions can be monitored while in progress without disturbing the components of the reaction mixture.

Performance metric 7. The OPP delivers the samples into a standard electrospray ion source which has historically been shown to have high precision and accuracy providing CV's less than 10%. The accuracy and precision of acoustic dispensing plays a role here as well.

Performance metric 8. The OPP delivers the samples into a standard electrospray ion source which has historically been shown to have high sensitivity with efficient conversion of molecules to ions and transport of ions into the vacuum system. The flow rates support both high sensitivity and robust operation and are in the microflow range, tens to low hundreds of microliters per minute.

Performance metric 9. The OPP delivers the samples into a standard electrospray ion source which has historically been shown to have the highest compound coverage of any ion source used for mass spectrometry.

Performance metric 10, however, cannot be addressed by the current approaches used to calibrate acoustic dispensers. Biological systems being measured by mass spectrometers are commonly analyzed where fluids having a broad spectrum of fluid properties and viscosities and can change over time during a reaction or incubation in unpredictable ways. Mass spectrometry is an analytical measurement tool used for a wide variety of applications and sample types, as opposed to a plate replicating tool, and will thus need have a means to rapidly and automatically adjust the physical parameters as needed on a per sample basis to be useful. For ADD-MS to be a viable technique a means to calibrate the acoustics parameters to deliver accurate and precise volumes automatically as samples of different viscosities are encountered. We refer to this ability to calibrate on a per sample basis as "calibration on the fly".

Examples of situations where the sample composition will vary are widespread necessitating calibration-on-the-fly. Blood samples can have widely differing viscosities depending on the hematocrit. In cases where preservatives are added to blood or plasma or some degree of purification is done to preserve the sample, viscosity altering additives such as alcohols, acids, salts or other dilutants will affect their fluid properties. The viscosities of urine samples are widely influenced by the state of health of an individual. The properties of biological fluids from different species vary greatly.

Situations where the sample composition, thus viscosity, can be changing radically over time in an unpredictable manner are common. The monitoring of fermentation and cell culture media over an incubation time period is a good example. During the change in the life cycles of the cells the media changes in its bulk chemical composition substantially. It has been reported that the media present at the beginning and end of a fermentation or incubation time can be acoustically dispensed but dispensing fails during the middle time periods. It appears that an abundance of complex carbohydrates is produced during these failure periods resulting in a sufficiently high viscosity change to render the original calibration parameters inadequate. The only way to deal with this type of situation is calibration-on-the-fly.

This invention presents a method and apparatus to measure to volume of individual droplets dispensed with micro-dispensing technology. It enables calibrate on-the-fly which utilizes a mass spectrometer to directly measure the mass of calibrants in the individual droplets and utilizes a modified OPP to capture the droplets, transport them to an atmospheric pressure ionization mass spectrometer, and deliver a reference compound to increase the accuracy and precision of the resulting droplet volume measurement.

Mass sensitive versus concentration sensitive approach. Mass spectrometers are mass sensitive detectors as well as devices that measure the molecular weights of molecules based on their mass to charge ratio. The determination of the amount or mass of a compound in a sample by a mass spectrometer is done by counting the number of molecules of that compound in a sample after they have been given a net charge by inducing either a deficit or excess of electrons, a process called ionization. Similarly, radioisotope detectors directly measure the mass of a compound in a sample by counting the number of nuclear decay particles per unit of time. For the most part spectroscopic methods directly determine the concentration of molecules in solution from the absorption, transmission, or emission of light for example utilizing the relationship expressed in the Beer Lambert Law.

The direct measurement of the mass of a calibration compound of known concentration in a droplet provides the volume of that droplet directly. Measuring the concentration of a calibration compound of known concentration in a droplet does not provide information about its volume directly. Its volume can be estimated indirectly by diluting the droplet to a much larger known volume where the volume contribution of the droplet is insignificant and reading the concentration of the diluted sample from a calibration curve of concentration versus spectrophotometric signal. This will provide the mass of the calibration compound in the original droplet. This method is indirect and requires additional droplet manipulation therefore not amendable to real time volume measurement. In practice several droplets are counted and collected and the calculation of the mass of the total is done providing a mean average droplet volume, not the exact volume of each droplet.

Capturing, transporting, and ionizing the calibrant in each droplet. The present system and methods provide for the direct determination of individual droplet volumes using atmospheric pressure ionization and a mass spectrometer to count the ions produced from a calibration. This is done by measuring the mass (amount) of a calibrant compound of known concentration in the droplet of unknown volume thereby determining the volume of that droplet directly. Droplets are introduced in the liquid phase into an atmospheric pressure ion source for ionization of the calibrant molecules followed by counting with the mass spectrometer. Preferred methods of ionization are electrospray and atmospheric pressure chemical ionization but are not limited to them. FIG. 1A presents, an exemplary mass analysis instrument 100 according to various embodiments of the present teachings. The mass analysis instrument 100 is an electromechanical instrument for separating and detecting ions of interest from a given sample. The mass analysis instrument 100 includes computing resources 130 to carry out both control of the system components and to receive and manage the data generated by the mass analysis instrument 100. In the embodiment of FIG. 1A the computing resources 130 are illustrated as having separate modules: a controller 135 for directing and controlling the system components and a data handler 140 for receiving and assembling a data report of the detected ions of interest. Depending upon requirements the computing resources 130 may comprise more or less modules than those depicted, may be centralized, or may be distributed across the system components depending upon requirements. Typically, the detected ion signal generated by the ion detector 125 is formatted in the form of one or more mass spectra based on control information as well as other process information of the various system components. Subsequent data analysis using a data analyzer (not illustrated in FIG. 1A) may subsequently be performed on the data report (e.g. on the mass spectra) in order to interpret the results of the mass analysis performed by the mass analysis instrument 100.

In some embodiments, mass analysis instrument 100 may include some or all of the components as illustrated in FIG. 1A. For the purposes of the present application, mass analysis instrument 100 can be considered to include all of the illustrated components, though the computing resources 130 may not have direct control over or provide data handling to, the sample separation/delivery component 105.

In the context of this present application, a separation/delivery system 105, comprises a delivery system capable of delivering measurable amounts of sample, typically a combination of analyte and accompanying solvent sampling fluid, to an ion source 115 disposed downstream of the separation system 105 for ionizing the delivered sample. A mass analyzer 120 receives the generated ions from the ion source 115 for mass analysis. The mass analyzer 120 is operative to selectively separate ions of interest from the generated ions received from the ion source 115 and to deliver the ions of interest to an ion detector 125 that generates a mass spectrometer signal indicative of detected ions to the data handler 140.

It will also be appreciated that the ion source 115 can have a variety of configurations as is known in the art. The present application is mainly directed towards ionization sources that operate by ionizing sample in droplet form, such as the electrospray process.

For the purposes of this application, components of the mass analysis instrument 100 may considered to operate as a single system. Conventionally, the combination of the mass analyzer 120 and the ion detector 125 along with relevant components of the controller 135 and the data hander 140 are typically referred to as a mass spectrometer and the sample separation/delivery device may be considered as a separate component. It will be appreciated, however, that while some of the components may be considered "separate", such as the separation system 105 all the components of a mass analysis instrument 100 operate in coordination in order to analyze a given sample.

Figure 1B:
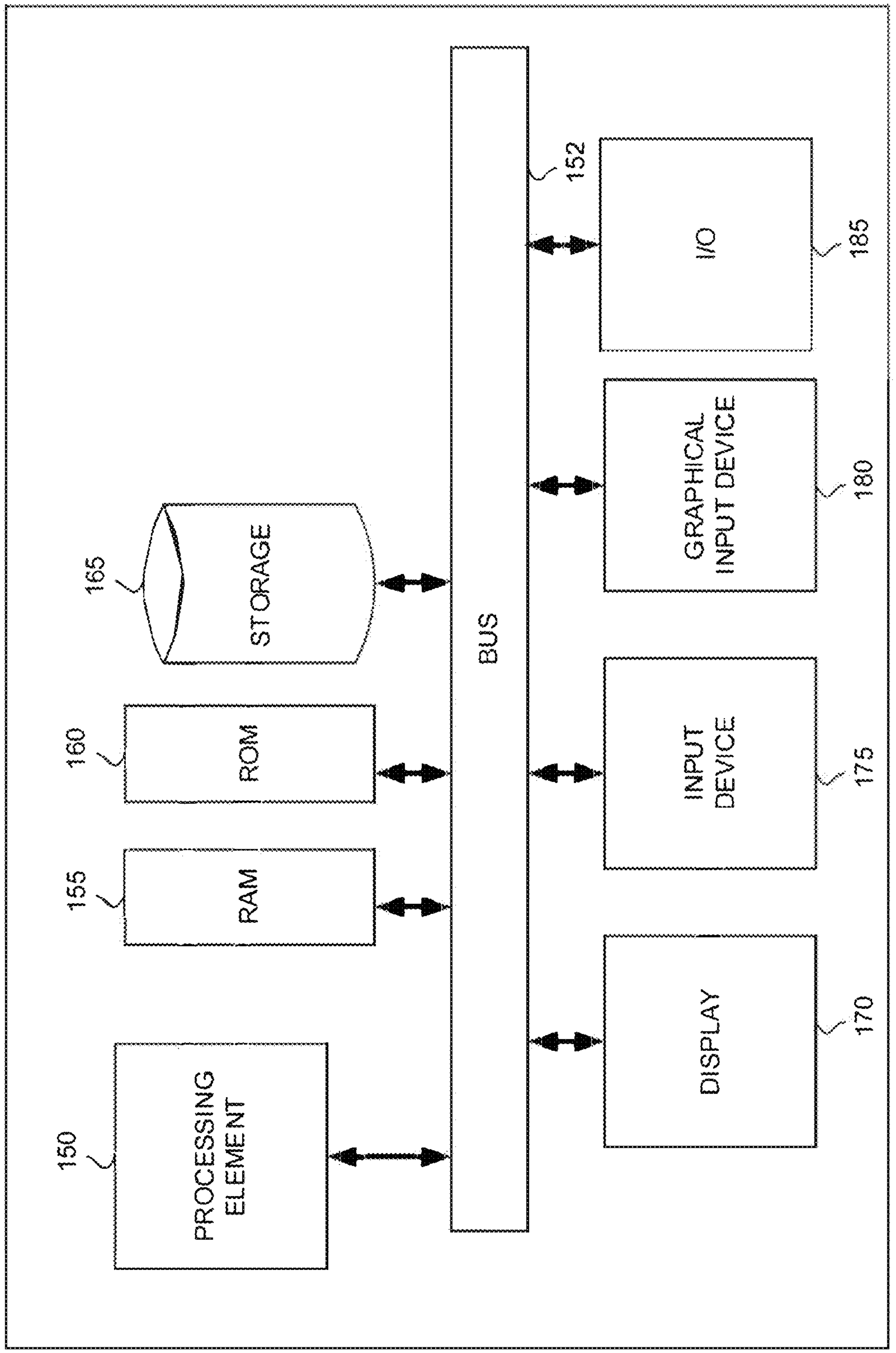

FIG. 1B is a block diagram that illustrates exemplary computing resources 130, upon which embodiments of the present teachings may be implemented. The computing resources 130 may comprise a single computing device, or may comprise a plurality of distributed computing devices in operative communication with components of a mass analysis instrument 100. In this example computing resources 130 includes a bus 152 or other communication mechanism for communicating information, and at least one processing element 150 coupled with bus 152 for processing information. As will be appreciated, the at least one processing element 150 may comprise a plurality of processing elements or cores, which may be packaged as a single processor or in a distributed arrangement. Furthermore, in some embodiments a plurality of virtual processing elements 150 may be provided to provide the control or management operations for the mass analysis instrument 100.

Computing resources 130 also includes a volatile memory 150, which can be a random access memory (RAM) as illustrated or other dynamic memory component, coupled to bus 152 for use by the at least one processing element 150. Computing resources 130 may further include a static, non-volatile memory 160, such as illustrated read only memory (ROM) or other static memory component, coupled to bus 152 for storing information and instructions for use by the at least one processing element 150. A storage component 165, such as a storage disk or storage memory, is provided and, is illustrated as being coupled to bus 152 for storing information and instructions for use by the at least one processing element 150. As will be appreciated, in some embodiments the storage component 165 may comprise a distributed storage component, such as a networked disk or other storage resource available to the computing resources 130.

Optionally, computing resources 130 may be coupled via bus 152 to a display 170 for displaying information to a computer user. An optional user input device 175, such as a keyboard, may be coupled to bus 152 for communicating information and command selections to the at least one processing element 150. An optional graphical input device 180, such as a mouse, a trackball or cursor direction keys for communicating graphical user interface information and command selections to the at least one processing element 150. As illustrated, the computing resources 130 may further include an input/output (I/O) component 185, such as a serial connection, digital connection, network connection, or other input/output component for allowing intercommunication with other computing components and the various components of the mass analysis instrument 100.

In various embodiments, computing resources 130 can be connected to one or more other computer systems a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example. Various operations of the mass analysis instrument 100 may be supported by operation of the distributed computing systems.

Computing resources 130 may be operative to control operation of the components of the mass analysis instrument 100 though controller 135 and to handle the data generated by the components of the mass analysis instrument 100 through the data handler 140. In some embodiments, analysis results are provided by computing resources 130 in response to the at least one processing element 150 executing instructions contained in memory 160 or 165 and performing operations on data received from the mass analysis instrument 100. Execution of the instructions contained in memory 155, 160, 165 by the at least one processing element 150 render the mass analysis instrument 100 operative to perform methods described herein. Alternatively, hard-wired circuitry may be used in place of or in combination with software instructions to implement the present teachings. Thus, implementations of the present teachings are not limited to any specific combination of hardware circuitry and software.

In accordance with various embodiments, instructions configured to be executed by a processing element 150 to perform a method, or to render the mass analysis instrument 100 operative to carry out the method, are stored on a non-transitory computer-readable medium accessible to the processing element 150.

Devices and methods to interface acoustically dispensed droplets to a mass spectrometer for analytical measurement purposes have been developed based on different principles. For example, U.S. Pat. No. 9,664,647 B2 transports the acoustically generated droplets to the entrance to the mass spectrometer through atmospheric pressure gas and evaporates them during the transit. US Patent Application US 2017/0243729 A1 is another variation on that theme adding a voltage to the bulk liquid sample bulk. None of these approaches have demonstrated to have the precision or accuracy to be able to measure the volumes of dispensed droplets. None of these disclosures deliver all of the performance metrics described in the previous section desired from a high speed, contact free approach for delivering samples into a mass spectrometer for analytical measurement purposes.

One preferred approach to transporting the droplets into the mass spectrometer ion source is by capturing each droplet in a flowing stream of transport fluid through a conduit or tube. Each droplet remains separate from the rest because of the laminar flow characteristics of the capture and transport device which minimizes diffusional spreading and the merging of droplets.

Figure 2:
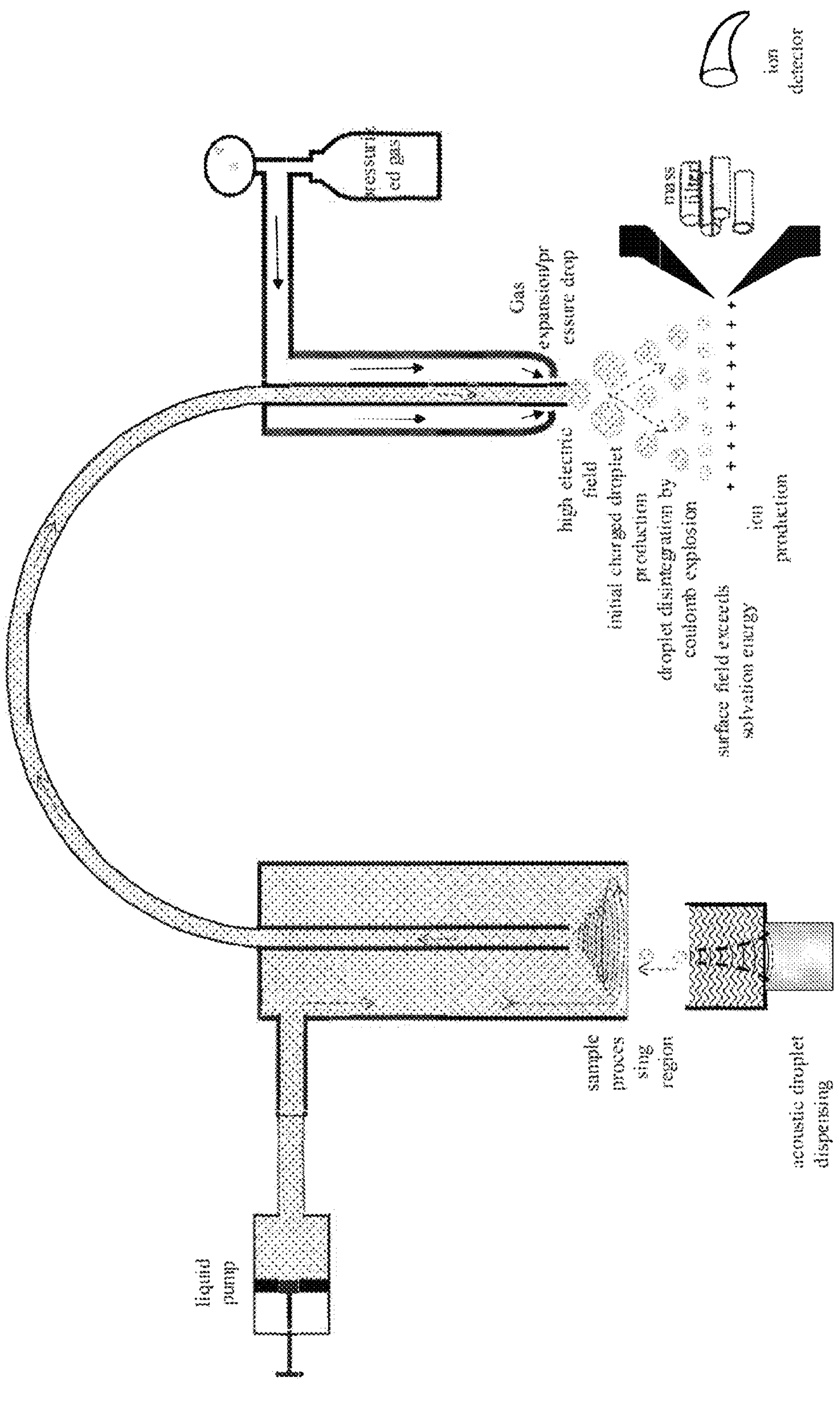
FIG. 2 illustrates an embodiment of a system of the present teachings.

FIG. 2 depicts an embodiment of the invention that illustrates the five main components, each having different functions. The first is a sample dispensing device whereby the amount of sample delivered can be controlled. In this embodiment the sample delivery is achieved by a burst of acoustic waves imparting energy into the surface of the fluid sample there by ejecting a droplet of known and controllable volume. The amount of sample entering the processing region can be varied by changing the power, frequency, or duration of the acoustic wave pulse. By varying the amount injected the dilution of the sample in the processing region is changed. Other sample delivery devices are contemplated, as described above.

The second component is a sample processing region of a capture probe where the samples are received, and the concentration of the sample is adjusted to be optimal for electrospray ionization. In this embodiment, the sample processing component comprises an OPP that includes a fluid delivery pump to provide the fluid for sample processing and transport. The flow of the transport fluid into this region can be varied with the pump thereby altering the degree of dilution of the sample and rate of transport. The volume of the sample processing region can also be changed by altering its geometry which will affect the amount of dilution the sample will encounter. This is an effective way to increase or decrease the dilution ratio but may require substitution of a physical part or additional mechanical linkage which may not be readily adaptable to rapid on-line modification of the dilution ratio in real time.

The third component comprises an ionization component which provides the facilities to create charged droplets from the processed sample including a gas expansion region to create a pressure drop to draw the samples from the processing region to the charged droplet generation region where a high electric field is applied. Application of the high electric field to the charged droplets converts the discharged sample droplets into sample ions. Control of this gas flow will allow one to vary the liquid flow out of the processing region thereby offering an additional means to alter the degree of dilution in the processing region.

The fourth component is an atmospheric pressure ionization mass spectrometer for receiving sample ions, filtering the sample ions by m/z and measuring the quantity of ions created.

The system is supported by a computing element equipped with data and algorithms for interpreting the generated signal and a controlling communication link to the sample dispensing device, the fluid delivery pump, and the pressurized gas source. After the signal is measured and the dispensed droplet volume is determined based on the generated analysis results, the system may be operative to adjust one or more parameters of the sample dispensing device to dispense a subsequent droplet of known volume for analysis by the fourth component mass spectrometer.

In some aspects, the embodiment may further include a motion component for moving a sample well plate including a plurality of sample wells to position an intended sample well in alignment with the sample processing region. In some embodiments, the time required to position a sample well and acoustically fire into the processing chamber is on the order of tens of milliseconds per sample. Individual samples can be stacked in the transfer line between the processing chamber and point of ion production where their spacing in time is limited only by the diffusion of the molecules in solution in the pipe, typically on the order of a few hundred milliseconds in prototypes of this invention. This enables near real-time firing of a sample, detecting its signal, comparing to a reference to assess suppression, and re-firing an amount to provide the appropriate dilution in the processing chamber to provide the correct conditions in the ion emitting droplets for a linear analyte response and avoid suppression effects.

Figure 3C:
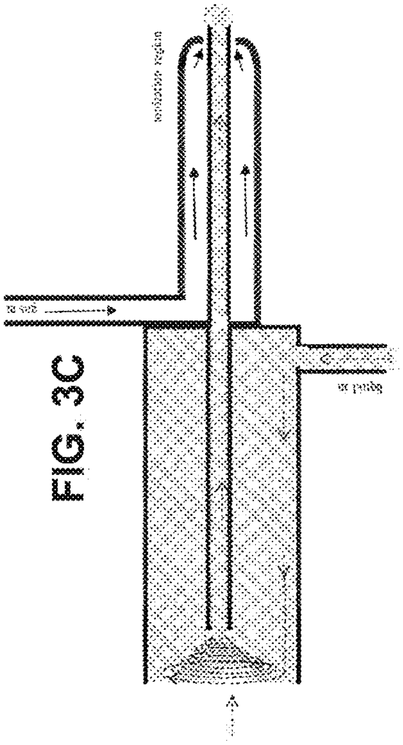
FIGS. 3A, 3B and 3C illustrate various orientations and configurations of embodiments of the present teachings.
Figure 3B:
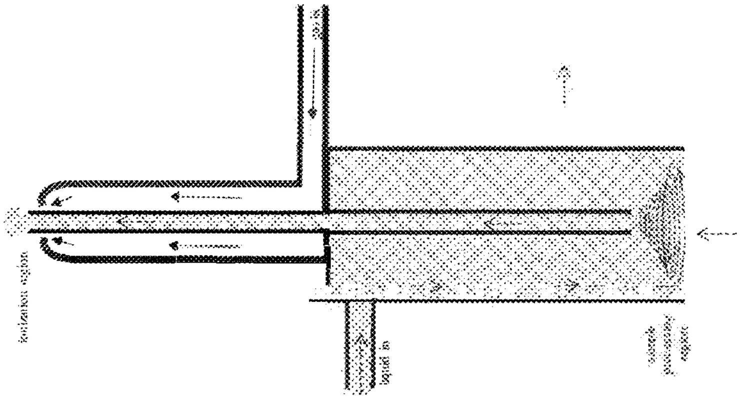
Figure 3A:
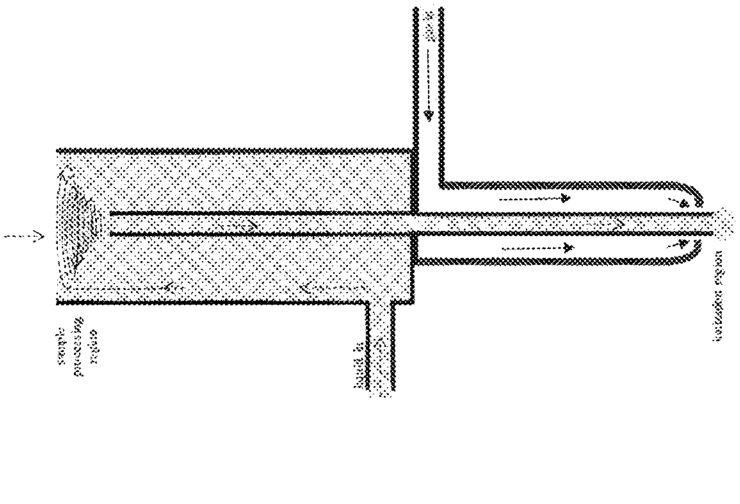

FIGS. 3A, 3B, and 3C depict different geometrical relationships between the components. FIG. 3A shows a sample processing component oriented vertically up and the charged droplet creation component oriented vertically down. This allows for samples to be deposited in the processing component with gravitational or other forces. FIG. 3B shows the same two compartments oriented in opposite vertical directions. FIG. 3C shows both compartments horizontally configured. Any angles between the vertical and horizontal can be used if samples can be introduced into the processing region and the charged droplet generating component is oriented so that ions can arrive at the entrance aperture of the mass spectrometer by some means.

If the micro dispensing technique naturally operates by firing droplets in the upward direction, counter to gravity, then the sample processing region may be positioned fluid down. The preferred mode of operation with this type of dispenser is for the flows to be balanced, i.e. inlet flow is equal to the outlet flow of the capture reservoir, so it will not spill out of the reservoir onto the sample. It can also be operated with the inlet flow slightly less than the outlet flow.

For microdroplet dispensers that dispense droplets down or at an angle, in the general direction of gravity, the sample processing region may face upward. In this situation the mode of operation can be either with a balanced flow, a flow in less than the flow out, or the flow in greater than the flow out, capturing the spill over in a moat or drain.

The mode of operation can be controlled manually by visually setting the flows while observing the condition of the reservoir. The mode can also be automatically controlled by monitoring the status of the reservoir with any one of several methods such as machine vision, light deflection, electrical conductivity, and the like and feeding the information back to the transport fluid delivery pump.

Figures 4A, 4B, 4C, 4D:
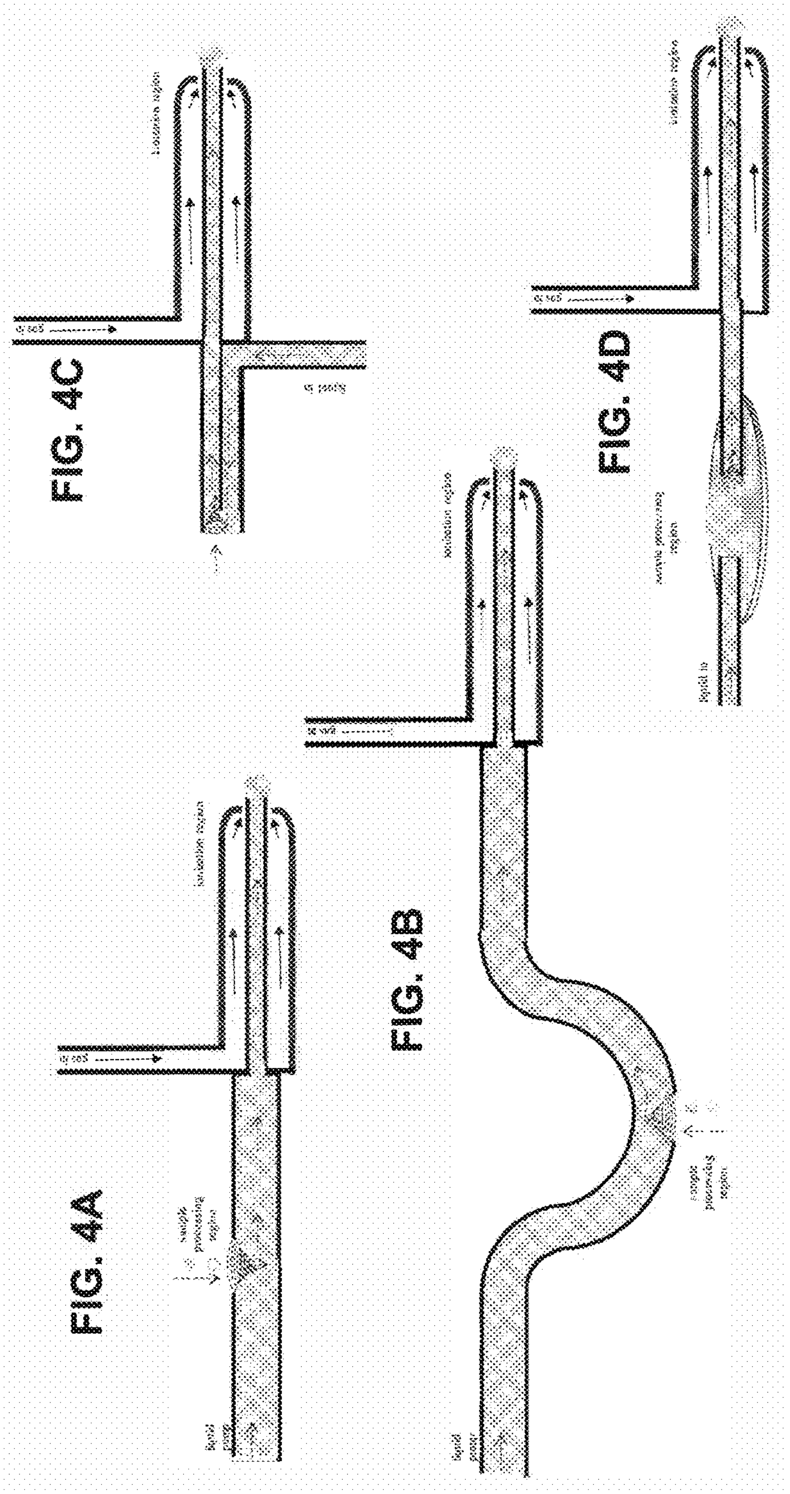
FIGS. 4A, 4B, 4C and 4D illustrate various embodiments of capture probes of the present teachings.

FIGS. 4A, 4B, 4C, and 4D show additional embodiments of capture probes presenting a similar sample processing region that have fluid inlet and outlet tubes that are not co-axially arranged. FIG. 4A & FIG. 4B show a single tube, or 2 tubes butted, linearly arranged or bent, that have an opening to admit samples into the processing region. In some aspects, the processing chamber may comprise a single tube with an aperture exposing the processing fluid flowing through the tube. FIG. 4C shows an inlet and outlet tube that are arranged parallel to each other. FIG. 4D shows the two tubes co-linearly arranged with a gap between them to define then to create the sample processing region. In some aspects, a planar grooved surface may be provided to confine the fluid by coating the surface with a hydrophobic material. In some aspects, a processing region may be bound by no walls and only confined by the surface tension of the pooled liquid on a surface as it transports between the 2 tubes. Other embodiments for capture probes that present a processing region are also contemplated, such as the use of 2 tubes in near or far proximity to each other enclosed in the processing chamber. A processing chamber in the form of an open trough with a supply tube supplying processing fluid and an exhaust tube draining processing fluid from the trough.

A preferred embodiment of the droplet capture/transport device and is referred to here as the Open Port Probe (OPP) which involves an arrangement of two concentric coaxial tubes, the inner tube being the conduit that transports the droplets to the ionization region, and the outer tube directs and confines the transport fluid (typically a solvent) being delivered from a pump to the entrance of the inner conduit tube at the sample processing region for capture of sample and to transport the captured sample through the inner conduit tube to the ion source. The sample processing region at the entrance of the inner conduit is filled with fluid that serves to capture droplets that are deposited into this region. The diameter of this droplet capture reservoir is preferably in the 0.5 to 5 mm range but can be larger or smaller. The volume of this reservoir is preferably in the 0.2 to 2.0 uL range but can be larger or smaller. The sample processing region is supplied with transport fluid by the pump through the outer supply conduit and emptied through the inner transport conduit at approximately the same rate. This steady state condition results in a permanent vortex located in the droplet capture reservoir that rapidly mixes and sweeps away droplets that enter. The flush rate of this droplet capture reservoir in the sample processing region is preferably <1 second for the entire volume of the capture region to be purged. Droplets dispensed into this reservoir in the low nanoliter range will be instantaneously diluted by a factor of 100-1000 fold depending upon the volumetric flow rate of the transport fluid through the sample processing region. This large dilution and efficient rapid mixing is an important factor for normalizing the mass spectrometer signal for a wide variety of samples solvents and matrices and for normalizing the mass spectrometer signal for a range of droplet volumes which are important requirements to enable the creation of a standard curves to be described below.

At the distal end of the inner transport conduit, is the ionization region inside the ion source. A nebulizer tube surrounds the droplet transfer conduit in this region through which a high-pressure gas (nebulizing gas) is delivered to a nozzle aperture restriction surrounding the exit of the transport conduit. When the high-pressure gas, typically air or nitrogen, exits the nozzle it accelerates approaching a velocity of MACH 1. The shearing force of the gas fractures the liquid into plume of droplets. The expanding gas at the exit also creates a local pressure drop at the end of the transfer conduit pulling the fluid through the transport conduit from the sample processing region. The velocity of the fluid can be between 1-1000 uL/min but preferably between 50-500 ul/min. The flow is preferably set to a constant rate determined by the pressure of the gas, the inner diameter of the transfer conduit, and the viscosity of the fluid. In order to balance the inlet and outlet fluid flows from the sample processing region, the pump delivering the transport fluid is adjusted to match the flow created by the aspiration of the fluid at the exit at the distal end of the transport conduit.

Figure 5:
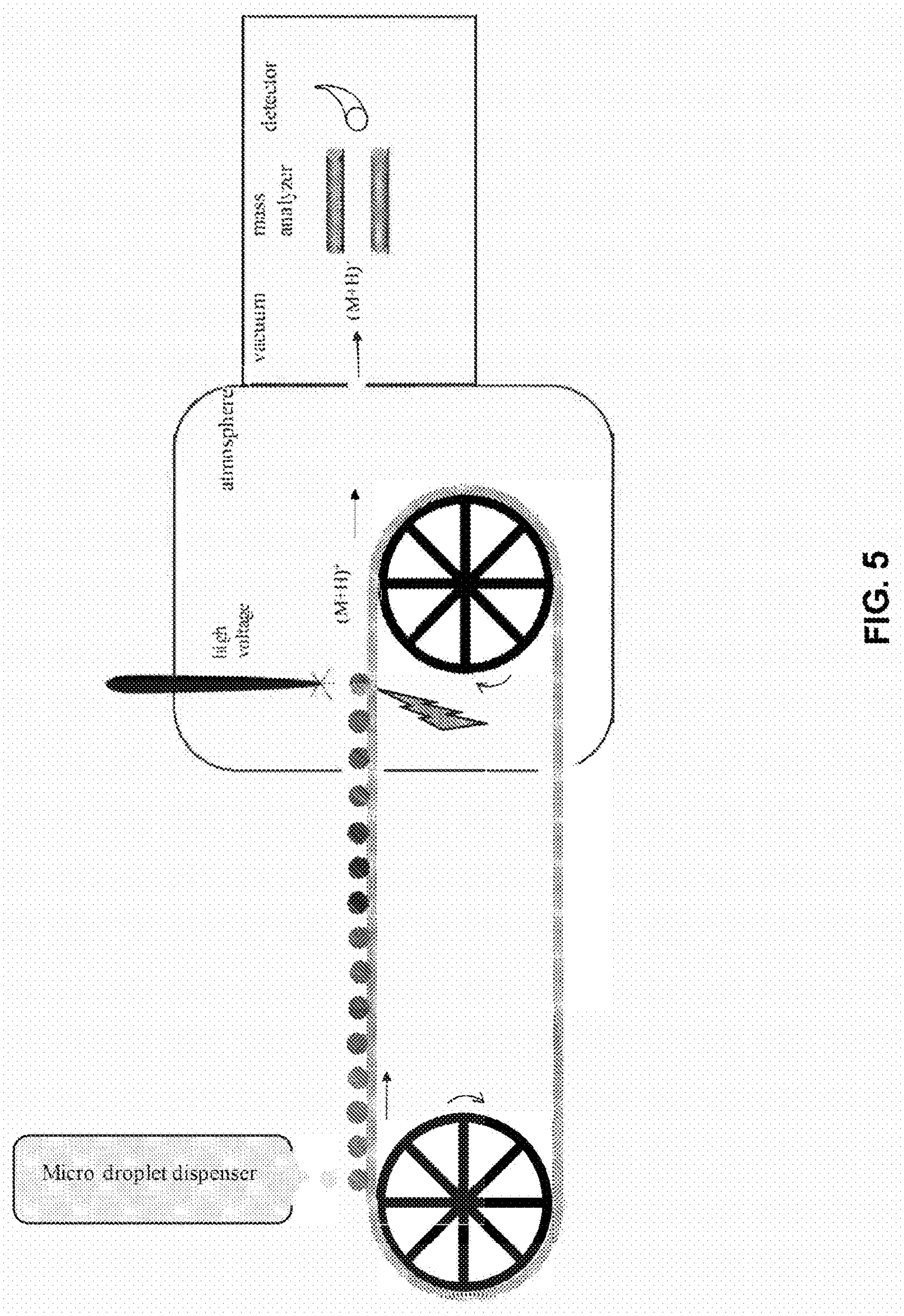
FIGS. 5 and 6 illustrate alternative embodiments of the present teachings.
Figure 6:
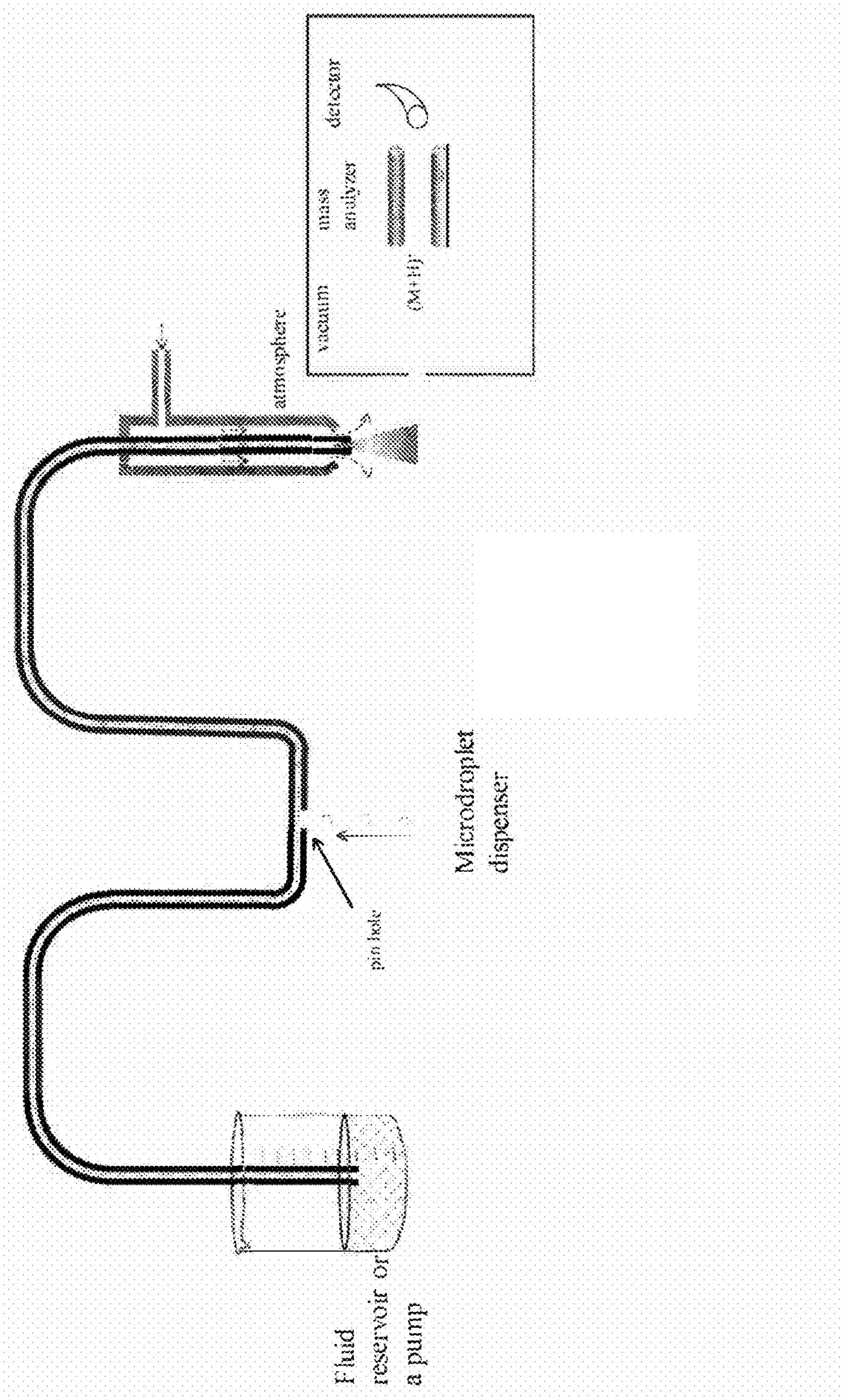

FIGS. 5 and 6 illustrate alternate embodiments of delivering sample droplets to a mass spectrometer for analysis. FIG. 5 illustrates a micro droplet dispenser dispensing droplets onto a conveyor that transports the dispensed droplets to an ionization source for ionization. FIG. 6 illustrates a linear capture probe with a pinhole aperture sample processing region ("linear OPP") that receives dispensed microdroplets at the aperture sample processing region for capture and transport to the ionization source.

Figure 7:
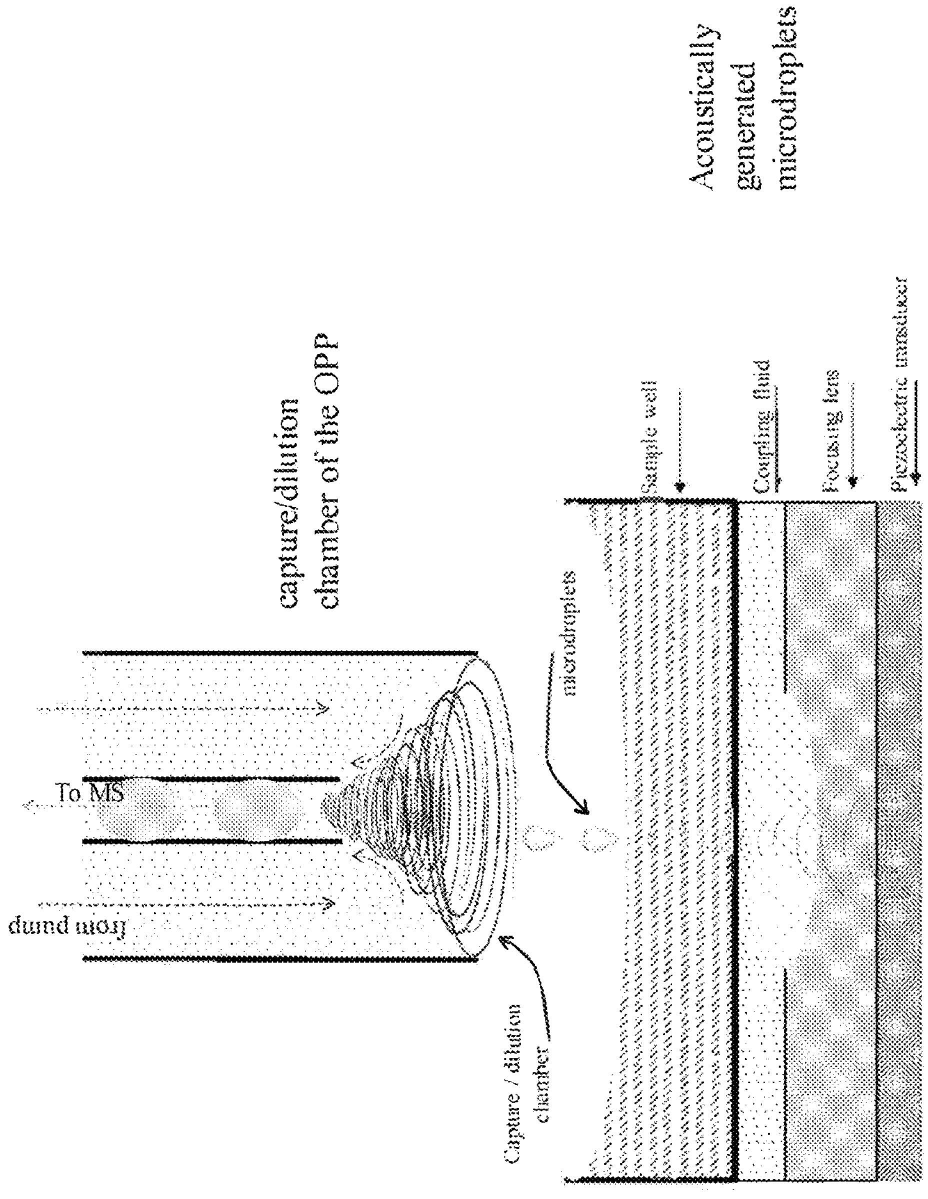
FIG. 7 depicts a cross-sectional view of an acoustic dispenser coupled to a sample well.
Figure 8:
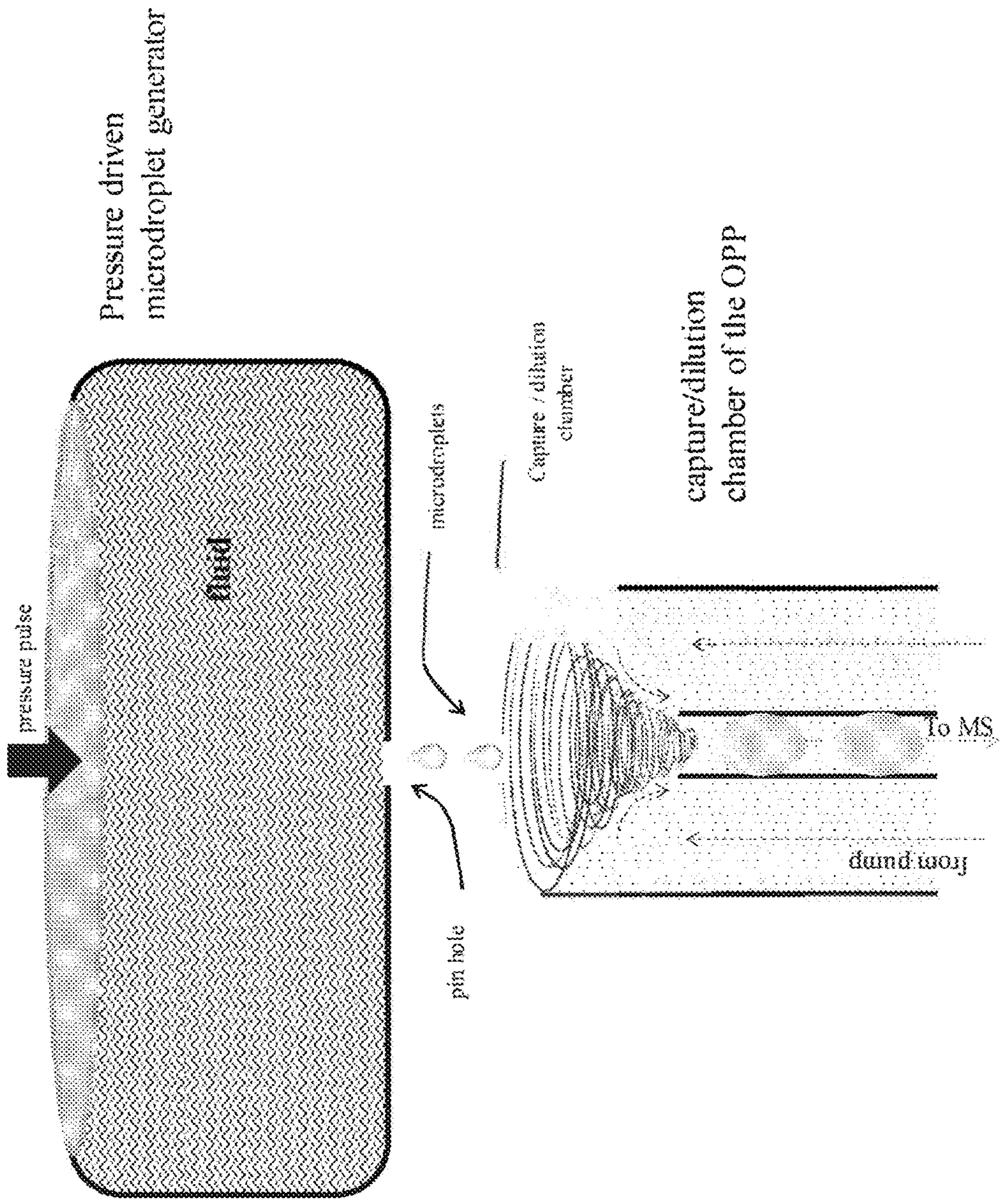
FIG. 8 illustrates another embodiment of droplet dispenser dispensing microdroplets into a capture probe.

FIG. 7 is a simplified cross-section drawing of an acoustic dispenser coupled to a sample well that is dispensing microdroplets into a sample processing region of a co-axial capture probe (OPP). FIG. 8 is an alternate embodiment of a droplet dispenser employing a measured force to force liquid sample through a small pinhole aperture.

Figure 9:
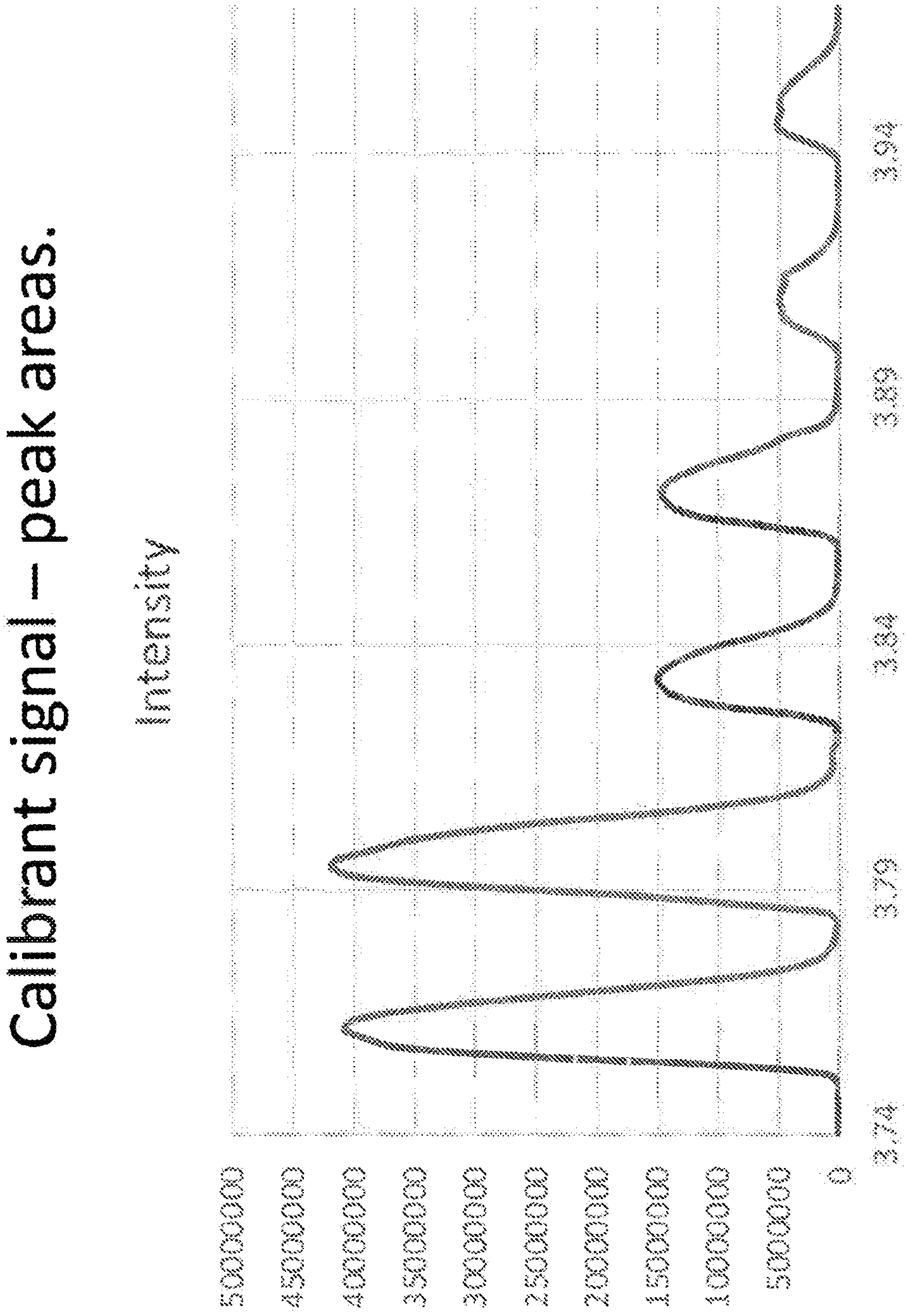
FIG. 9 illustrates a measured signal of samples including a calibrant.
Figure 10:
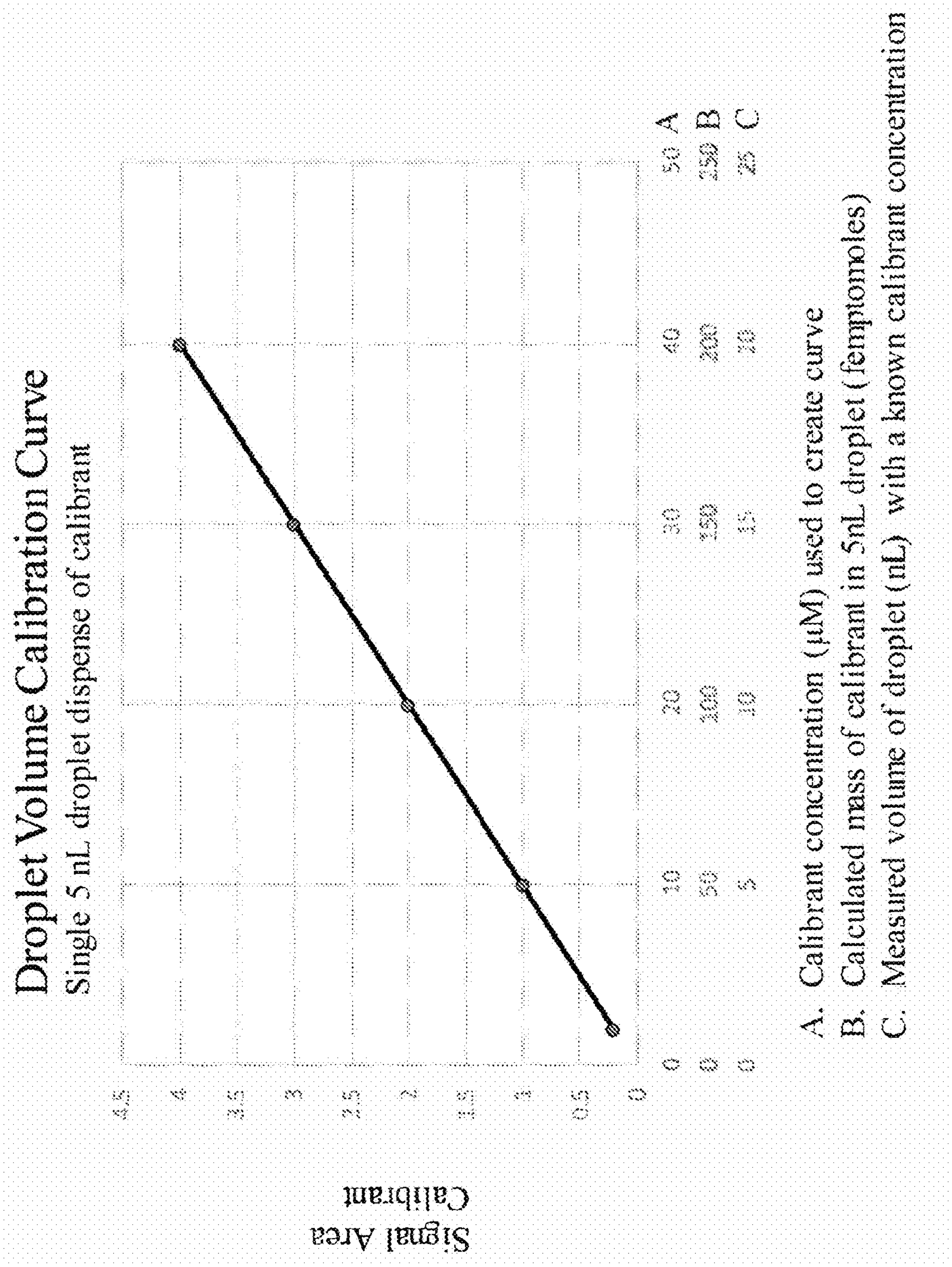
FIG. 10 illustrates a calibration curve.

Volume measurement based on mass using calibration compound signal. With a reliable means of capturing, transporting, and ionizing the solutes in a droplet the droplets volume can be determined based on the mass (amount) of calibrant that is measured in each droplet by the mass spectrometer. This is done by preparing a calibration curve relating the mass (amount) of a calibrant in a droplet to the signal from the mass spectrometer. FIG. 9 illustrates a measured mass signal, intensity, for a number of captured and analyzed samples including a calibrant. The peak area of each measurement varies relative to the amount of calibrant contained in each sample. The mass measurement data from FIG. 9, for instance, may be converted into a calibration curve by plotting signal peak area against the known calibrant concentration of the sample (FIG. 10).

The volume of the droplet used to create the standard curves must be known and in the approximate range of the size of the droplets to be measured. For example, if droplet volumes to be measured are in the 1-100 nL range, a volume for the calibration curve droplet of 5 nL would suffice. The mass spectrometer measures the mass of the calibrant in the droplet irrespective of its volume and bulk solvent composition. This measurement is greatly facilitated by the large dilution factor in the OPP capture reservoir ensuring that slight variations in signal due to droplet volume and composition are normalized. Phenomena such as the suppression or enhancement of the ionization efficiency due to the bulk sample composition are eliminated in the OPP droplet capture reservoir.

The volume of the droplet used to construct the calibration curve can be delivered and determined in a number of ways. For example, an acoustically dispensed droplet in the low nL volume range (1-10 ug) can be weighted on an analytical balance to determine its volume. It could also be done using the conventional spectroscopic method. Other types of pre-calibrated micro dispensers can also be used for this purpose such as piezo or pressure driven devices. Once the single calibration curve is constructed then that single curve can be used to calibrate the acoustic dispensing parameters for a wide variety of sample compositions with different viscosities and for a range of different droplet dispense volumes. The droplet volume of each sample to be dispensed for analytical measurement can also be checked as long as the sample contains the calibration compound.

The calibration curve will be specific to a specific mass spectrometer because mass spectrometers can have different signal levels for a calibration compound of a single concentration. The signal detected in a mass spectrometer can also change over time as the ion optics accumulate contamination from samples. Drifts in signal can occur within the period of a day depending on the sample load. This will not affect the ability of the calibrated acoustic parameters to deliver accurate and precise volumes using the parameters developed for a particular sample composition, but it will have an impact on measuring the volume of each sample dispensed in real time as the slope of the calibration curve will change. The purpose for real time volume measurement is if the sample viscosity changes from sample to sample in an unpredictable way the volumes dispensed will vary under a single set of acoustic dispensing parameters. Under worst case scenario some samples will not even dispense with those acoustic parameters. This will be detected and noted because of a no signal condition but nothing can be done to correct for it at that time.

Volume measurement based on mass using ratio of calibration and reference compound—the Master Standard Curve. Construction of a master standard curve is a preferred embodiment because it corrects for the use of different mass spectrometers, for signal drift of a mass spectrometer, and enables real time volume measurement referred to thenceforth as volume measurement on the fly. Volume measurement on the fly not only corrects for slight errors each time a droplet is dispensed but also enables calibration on the fly. If a sample fails to dispense because its fluid properties are out of the range of the calibration parameters re-calibration can be quickly done to establish the correct conditions to fire a droplet with the correct volume.

The standard curve prepared using a ratio of calibration and reference compound is referred to as the master standard curve. It is prepared in a similar fashion to the curve using a calibration compound of known concentration in the sample to be dispensed. An accurate volume of the calibration compound must be dispensed approximately within a broad range of the final targeted volume to which the dispensing parameters will be adjusted to achieve, as described above. The difference is a reference compound of known concentration is added to the transport fluid of the capture probe. The reference compound may be added to the transport fluid in the reservoir that supplies the capture probe, or may be injected as a supplement to the supply of transport fluid supplied to the sample processing region. The relationship to be established is the ratio of calibration compound signal divided by the reference compound signal [C/R] to the mass of the calibration compound dispensed (See FIG. 11) An ideal situation is when the calibration and reference compounds are stable isotope variants of each other. This corrects for all variabilities that could be introduced as a result of the differences in their chemical properties (See, FIG. 12).

The master standard curve is referred to as such because it only needs to be prepared once. When constructed with stable isotope variants of calibration and reference compounds it is applicable to a mass spectrometer at different stages of performance degradation throughout its operational lifetime and to all mass spectrometers of different types. This single master standard curve is applicable to all solvent combinations and different sample compositions well as variations in the droplet volumes when doing analytical measurements. One reason for this is, for embodiments that employ a capture probe, the normalization effect on the ionization process due to the large dilution volume of the capture probe (e.g. OPP) referred to earlier. The other is a ratio of signals from the calibrant and reference is used to measure the volume, isotopic variants or otherwise.

Since the master standard curve does not have to be reconstructed on a per sample basis it is applicable to volume measurement on the fly which allows for deviations in sample dispensed volumes to be accounted for during calculation of the sample concentration. The ratio of calibrant and reference compounds can be used to determine the volume from the master standard curve very quickly, typically tens of milliseconds. It also enables calibration on the fly. When samples of unknown composition are encountered the volumes dispensed using existing, suboptimal calibration files can be quickly measured without resorting to the creation of new calibration files. If the volume dispensed is outside of the target range of the acoustic parameters typically power and duration are adjusted and the volume remeasured. Repeat volume measurements and parameter adjustments are made on individual droplets until target volumes are achieved. If a droplet is not dispensed at all because the acoustic parameters are not correct for this sample the lack of signal would be detected and a rapid recalibration is now possible. This process can be very fast with multiple iterative measurements and adjustments per second and automated. The time this takes will depend on how many iterations of parameter adjustment are required to achieve the targeted volume. In most cases this would take less than one second. Very little sample is required. Calibration files associated with very specific depths at very tight intervals are readily achieved.

Scenarios where the fluid properties of samples can change on a case by case basis are common when analytical measurements are required on the sample. For example, blood from patients experiencing different physiological states will have different hematocrits with widely varying sample viscosities. Human urine from different disease states exhibits similar variabilities and the urine from different species will represent extremes on the viscosity scale. Fermentation media and bioreactors used for the production of valuable pharmaceutical and industrial chemicals will, at different periods of the media's life cycle, have different concentrations of solutes such as polysaccharides that have profound effects on the fluid properties.

The master standard curve can be prepared from a single solvent for the reasons already described. An ideal microdispensing solvent can be used as the standard to increase the utility and practicality of this approach. One ideal solvent is dimethyl sulfoxide (DMSO) which has sufficiently high viscosity and surface tension to yield highly stable droplets in the picolitre to nanoliter range. It has a high vapor pressure minimizing errors due to evaporation. Stable and reproducible test solutions and protocols are essential for instrument and method validation and verification.

The reason this single master standard curve is agnostic to sample type, sample dispensed volume, mass spectrometer, and condition of mass spectrometer are twofold. The first is because variations in the ionization efficiency and mass spectrometer response due to variations in these scenarios is accounted for by using the ratio of response of calibrant and reference compounds. Both are affected equally when conditions change. When calibrant and reference compounds are stable isotopic variants of each other all chemical effects are eliminated as they differ only in their nuclear properties, not electronic/chemical properties. In practice the most abundant isotope would be used as the reference compound in the transport fluid because of the greater consumption.

The least abundant isotope would be the calibrant in the sample because very small amounts of this more expensive reagent would be used.

The second reason is because of the properties of the capture probe and mass spectrometer interface. For instance, acoustically dispensed samples are in the low nanoliter range. A capture probe such as the OPP instantaneously mixes them upon capture 100-500-fold in the transport fluid. For all practical purposes what is being delivered to the electrospray ionization region is the transport fluid irrespective of what the composition of the sample is or the droplet volume within the typical range.

Figure 13:
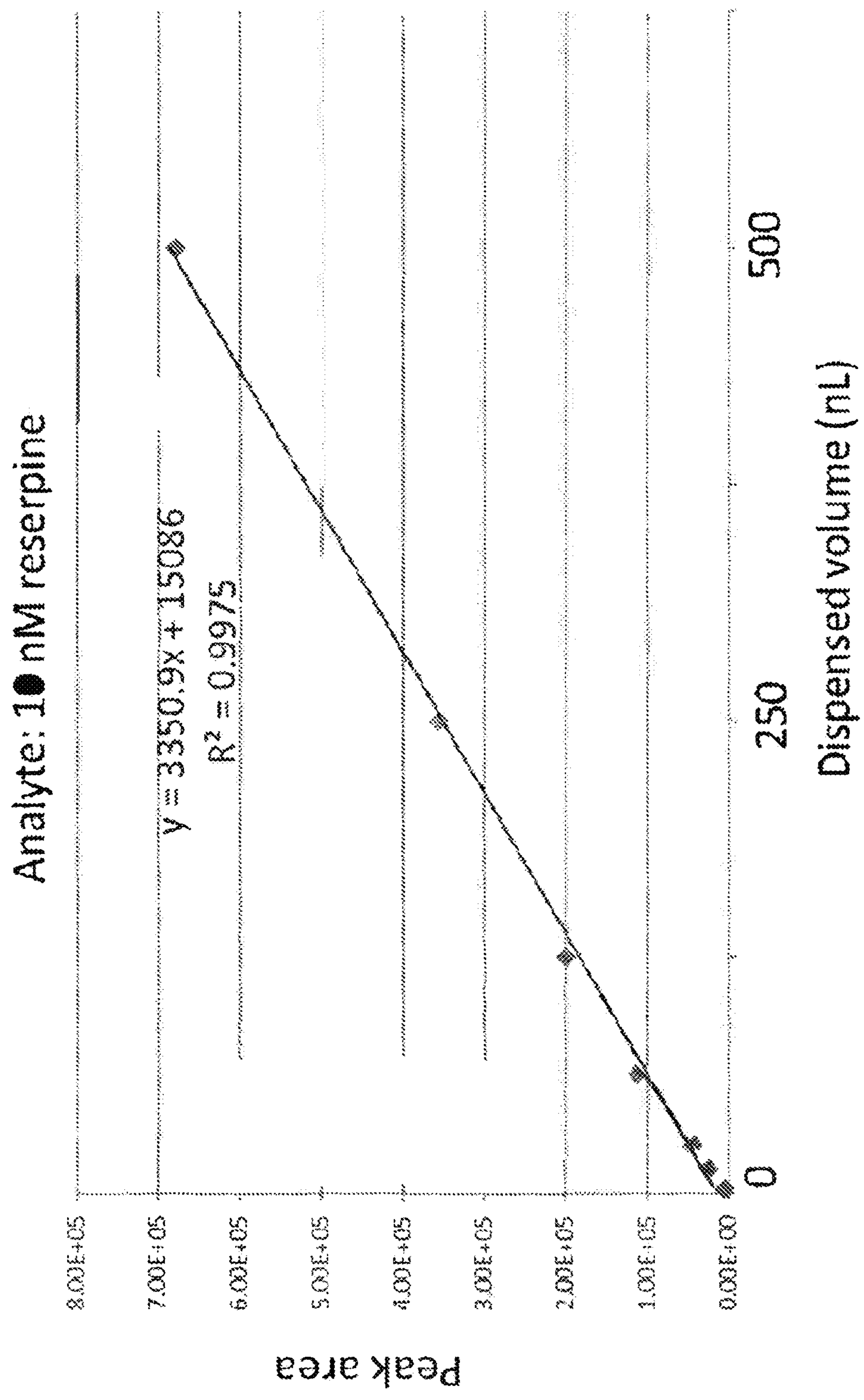
FIG. 13 illustrates another calibration curve.

FIG. 13 illustrates an alternate standard curve embodiment derived by introducing sample with a same concentration (e.g. 5 uM), and varying the total dispensed volume (1-100 nL). The higher dispensed volumes may, for instance, be achieved by high-frequency multiple-dispensing as described above.

Embodiments of the present application may be usefully used in novel applications of ADE-OPP such as fermentation analysis and kinetics analysis. An explanation of kinetics analysis is described below.

The apparatus and method invention described herein is for a system comprised of several components designed to perform in situ kinetic measurement including measurement when sample solutions come to a static equilibrium and are no longer changing with time.

Understanding the chemical properties of solutions, and how they change over time, is a fundamental tenant in the fields of chemistry, biochemistry, and clinical chemistry. A method and apparatus has been developed to monitor the chemical composition of solutions as they change over time in a controlled manner as well as when they remain static and in a final equilibrium. We refer to the method enabled by this invention “in situ kinetics”.

Figure 14:
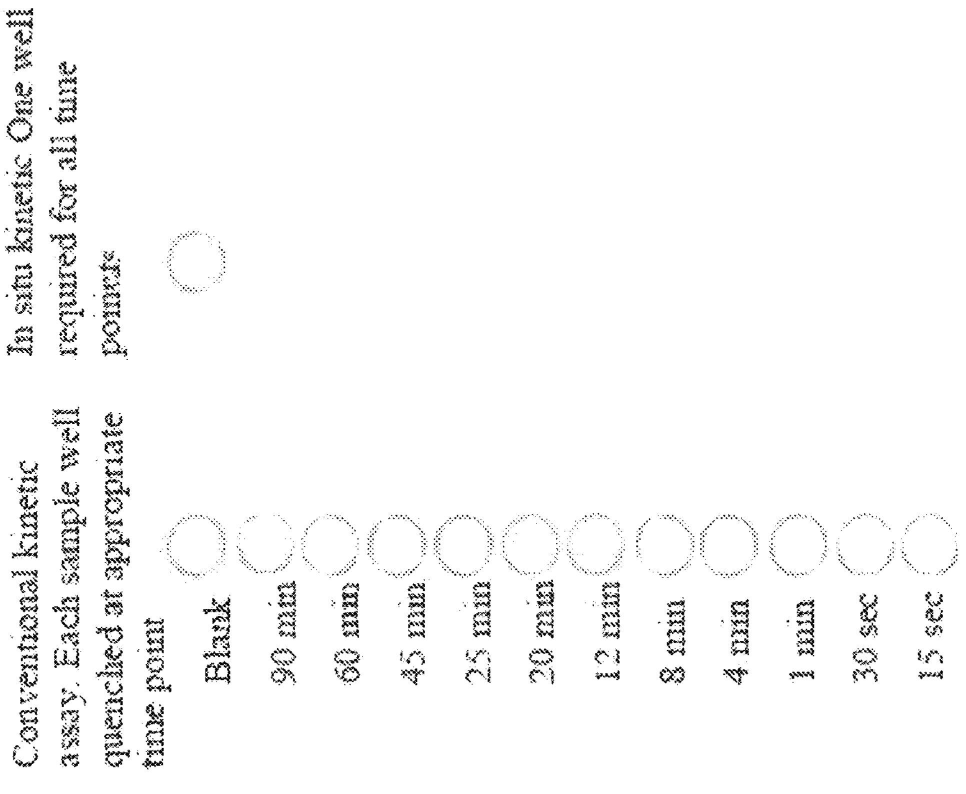
FIG. 14 illustrates an embodiment of an in situ kinetics measurement.
Figure 15:
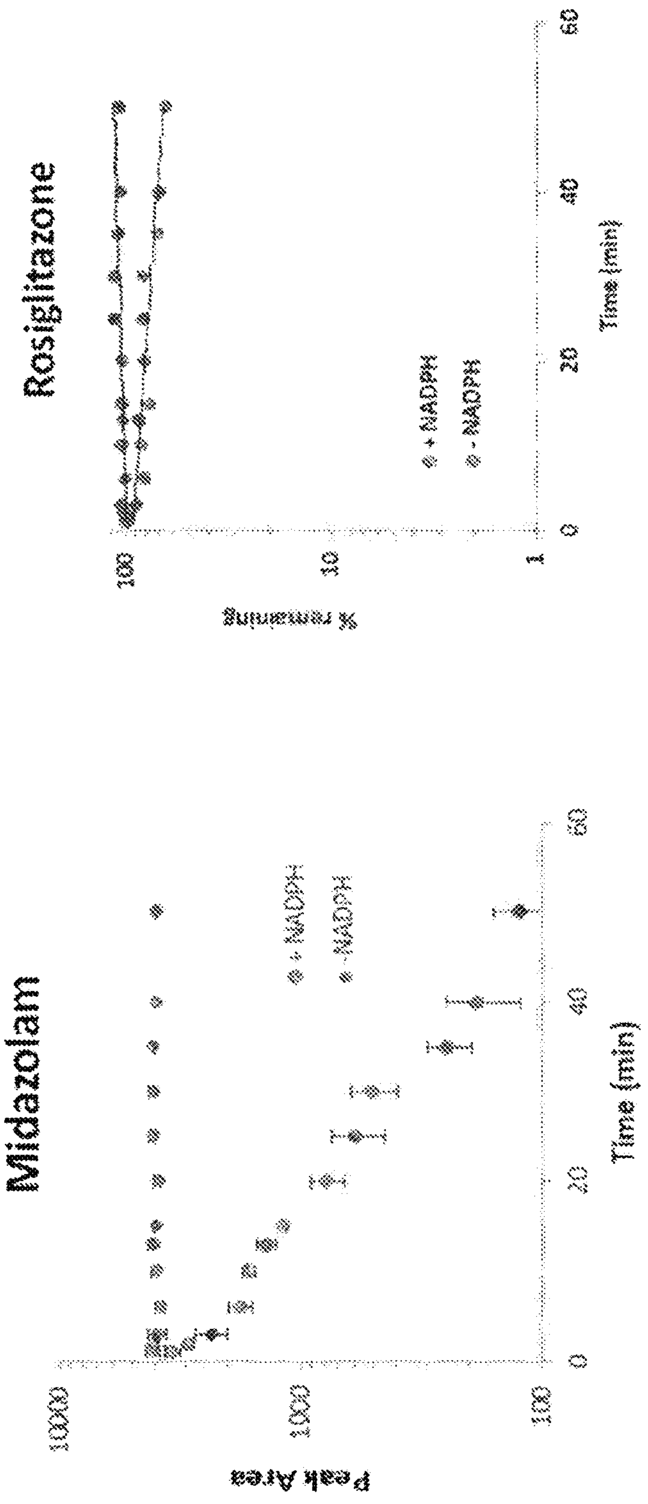
FIG. 15 illustrates data from an example in situ kinetics measurement.

In one embodiment a chemical or biochemical reaction can be monitored over time intervals by dispensing discrete nanoliter volume droplets from at least one reaction well, for instance at regular sampling intervals. In this embodiment the reaction occurs within the reaction well and products within the well are sampled as the reaction continues. This is in contrast to the conventional approach of preparing several reaction wells, each representing a different time point for measurement, and quenching the reaction in each well at the appropriate time followed by the analysis of the series of wells. This approach multiplies the number of sample wells to be prepared thereby increasing expensive reagent and consumable costs, limits the frequency and duration of the time point measurements, and increases experimental artifacts due to the quenching process. This difference is illustrated in FIG. 14. Data from an in situ kinetic study is shown in FIG. 15 which illustrates kinetic data from a human liver microsome assay which illustrates the disappearance of two drugs due to metabolic consumption. Reactions were done with and without the NADPH, a necessary co-factor for the cytochrome P-450 enzymes.

In order for this new in situ kinetics method to be fully enabled several conditions must be met. The apparatus and method we have developed meets all of these criteria. It involves the use of a mass spectrometer as the detector with a sample inlet interface to the mass spec referred to as the open port probe (OPP) which is described earlier in the calibration portion of this document. Samples are dispensed into the open port probe using acoustic sound waves also described earlier in the calibration portion of this document. The open port probe captures the droplets dispensed from wells or test tubes and an internal standard can be added to the transport fluid of the OPP to normalize the signal also described in the calibration portion of this document.

The conditions that must be met and how this is achieved are as follows.

1. Dispensed volumes must be small relative to the bulk reaction so as to not deplete the reaction or alter the kinetics due to volume/diffusion rate altering phenomena. With this method dispensed volumes are in the low nL range, typically 1-20 nL, whereas reaction volumes are in the μL range, often in the tens to hundreds of μL.

As described in the calibration portion of this document, physical parameters are established to dispense in this volume range with sound waves.

2. Dispensing should be contact free for each successive time measurement so as not to be influenced by a previous measurement due to cross contamination of samples. This apparatus and the method it enables dispenses in a contact free manner resulting in a zero-sample carry-over scenario.

The firing of droplets with acoustic energy avoids the use of physical surfaces such as pins or pipettes to withdraw sample. Surfaces are always sources of problematic carry-over. The droplets are captured in a fluid vortex at the entrance of the open port probe and immediately swept away. This washing vortex is shown in FIG. 5. The fluid chosen is one in which the samples are highly miscible and will not precipitate out of solution. The sample never contacts a solid surface.

Figure 16:
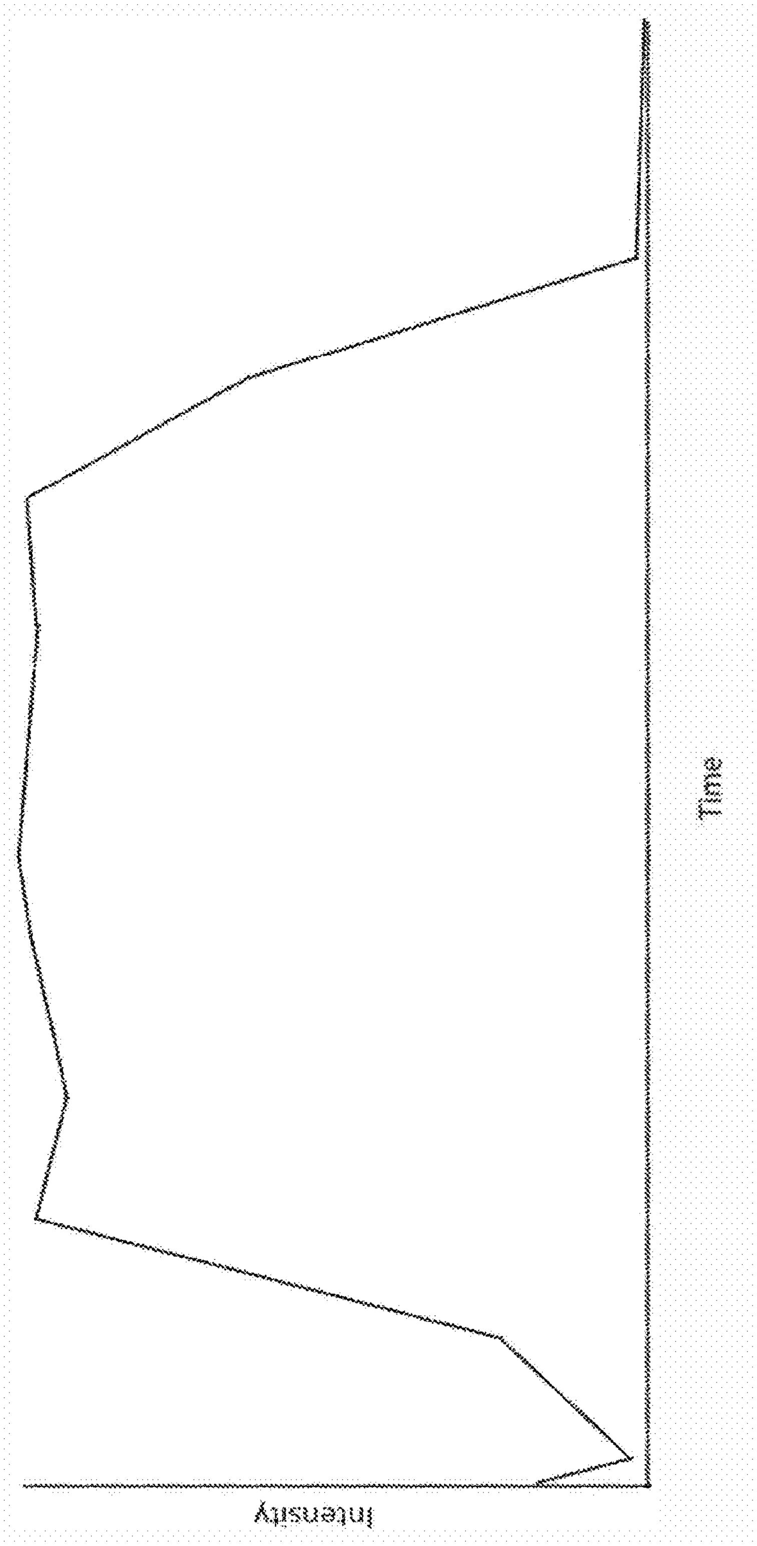
FIG. 16 illustrates measurement data from an example of high frequency dispensing from a sample well for mass analysis.

3. Sample dispensing must be fast and capable of being dispensed at any time either close to the initiation of the reaction or at any time interval thereafter. This apparatus and the method it enables can dispense discrete samples at a rate greater than 1 Hz, typically in the 0.1-10 Hz range and capable of accessing a broad range of 0.01-100 Hz. FIG. 16 is data from samples being run at about 0.6 Hz.

Acoustic sound waves can dispense droplets at frequencies as high as 1 kHz but transferring these droplets as discrete entities to the mass spectrometer is problematic. When they are fired into the open port probe they stack in the transfer line transporting them in the transport fluid to the mass spectrometer. Diffusion phenomena limit how close in space and time these droplets can be stacked. The current limitation is approximately 3 per second before they begin to merge.

4. Continuous sampling where measurement over the duration of the reaction is uninterrupted is a required option. In situations where information may be lost, even when sampling at high frequency, a continuous uninterrupted stream of sample must be possible. This invention will dispense a continuous stream of sample for short periods of time or for as long as there remains sample in the well.

To achieve an uninterrupted continuous signal, droplets are fired into the open port probe at a rate where they merge in the vortex. This occurs at frequencies of approximately 5 Hz or greater. A steady state signal results for as short or long a period of time as is required for monitoring the reaction kinetics on a continuous basis. See FIG. 16 which illustrates a continuous mass spectrometer signal resulting from dispensing droplets at 30 Hz causing the droplets to merge in the transport conduit of the capture probe. This technique is also useful for many other purposes such as tuning of the mass spectrometer lenses, mass analyzers, or employing methods of data acquisition that benefit from having a longer period. Examples of this are signal averaging to increase signal to noise and accurate mass measurements which benefit from the better ion statistics that are achieved with a longer integration time.

Acquiring data having the differential ion mobility compensation voltage values for every compound in a sample will be enabled when the time of sample introduction can be increased to any desired value. Data acquisition methods such as SWATH obtain product ion spectra on every precursor ion present in a sample. An enormous amount of information about the precise chemical composition of a sample results but being able to adjust the sample introduction time long enough for good signal to noise to be achieved on all components of the sample is enabled by this invention. Combining differential ion mobility scans with SWATH will provide a deep chemical coverage of a sample by combining orthogonal separation techniques. But these powerful techniques can only be realized if the sampling time can be automatically adjusted and controlled. With this acoustic injection approach, the sampling time can be automatically adjusted for each individual sample by measuring the S/N on the fly as signal averaging gradually improves it, stopping the acoustic dispensing when the targeted value is achieved.

5. The reaction should be dispensed in its original form without any requirements by the measuring tool to purify or modify the composition in any way. For example, the direct analysis of biological fluids, enzymes, cofactors, buffers, and surfactants without pre-purification is necessary to maintain the integrity of the original reaction in that medium. Similarly, requirements to modify physiological buffer conditions so they are compatible with the measuring tool are to be avoided because it is possible the results are no longer representative of living systems.

The direct analysis of complex biological samples without some degree of sample purification before the sample is introduced into the mass spectrometer is not currently done because of ionization suppression. Ionization suppression is a consequence of the physical-chemical processes involved in the ionization event. When exceedingly high concentrations of endogenous materials are present, ionization by electrospray is suppressed because the surface of the charged droplet containing the analyte is shielded by an impenetrable layer preventing the field emission of the analyte from the droplet. Similarly, when exceedingly high concentrations of endogenous materials are present, ionization by atmospheric pressure chemical ionization is suppressed by a phenomenon called reagent ion depletion. Endogenous materials of high gas phase acidities and basicities will consume all the charge present in the reagent ion population leaving none left for the analyte present in trace amounts compared to the bulk solution components.

Figure 17:
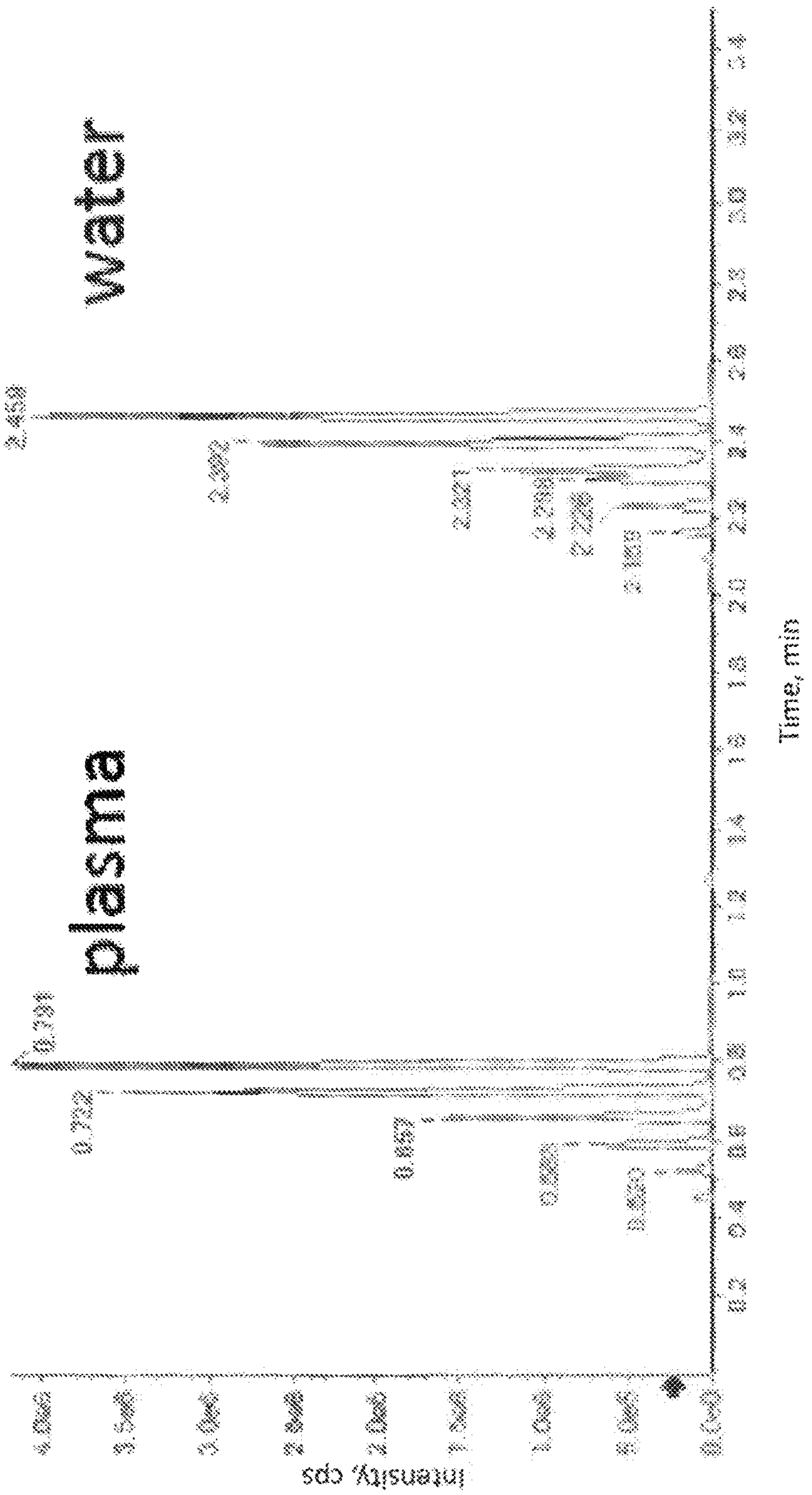
FIG. 17 illustrates measurement data illustrating no ion suppression for plasma injected into a capture probe.
Figure 18:
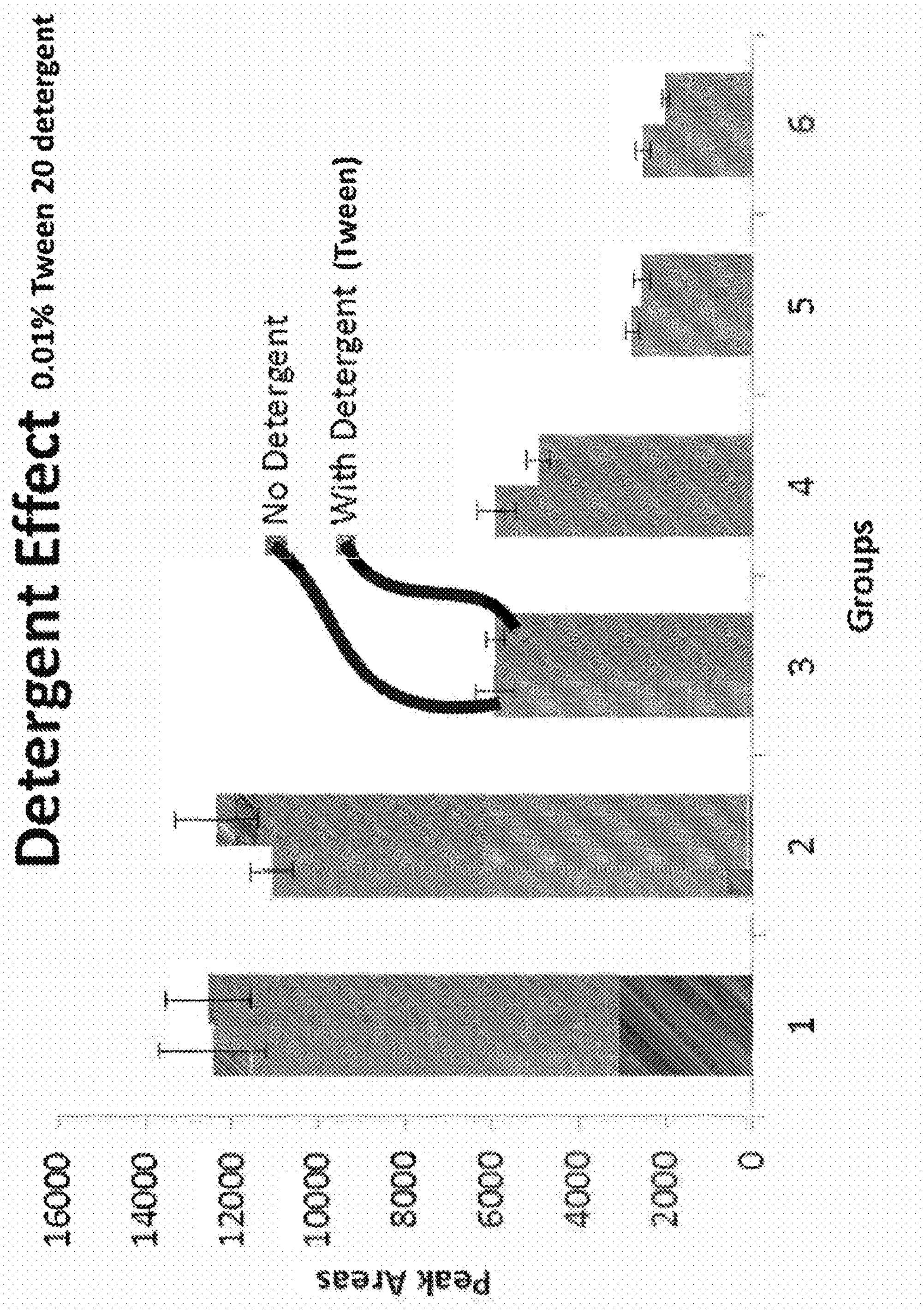
FIG. 18 illustrates measurement data illustrating no ion suppression for a surfactant (Tween 20) injected into a capture probe.

The data in FIG. 17 is an example demonstrating that no signal suppression occurs when plasma is directly injected into the capture probe. As illustrated, the analyte signal is similar though typically a plasma matrix would lead to ion suppression and subsequent signal loss. The data in FIG. 18 is an example demonstrating that no signal suppression occurs when a high throughput screening assay containing Tween 20 surfactant is directly injected into the mass spectrometer. As illustrated, the left bars with no detergent have similar peak area to the right side bars with detergent (Tween 20) for each group.

Figure 19:
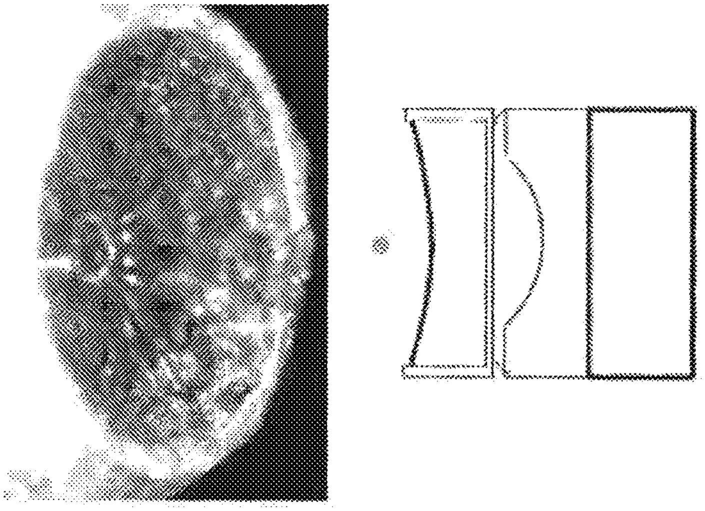
FIG. 19 is a simplified schematic illustrating droplet dispensing into a sample processing region of a capture probe.

This apparatus and the method it enables circumvents the need to purify samples prior to injecting into the mass spectrometer by the following means. FIG. 19 shows a 2.5 nL droplet dispensing into the vortex entrance of the open port probe. The vortex volume is on the order of 1 uL which results in an instantaneous 400 fold dilution followed by immediate transfer to the ionization region. Dilution of the endogenous materials counters their ionization suppression effects.

6. The addition of compounds extraneous to the requirements of the reaction for the purpose of enabling or improving the measurement must be avoided so as not to skew the results. One example is the addition of internal reference standards to the reaction to improve measurement accuracy and precision. This runs the risk of interfering with the activity of the enzyme or catalyst of interest.

A second example is the use of light absorbing or emitting labels linked to reaction components to provide a secondary, indirect means of monitoring the progress of the reaction. This also runs the risk perturbing the results because they are indirect measurements and the labels are often found to alter the activity of key components of the biological system such as enzymes, transporters, or receptors.

Figure 20:
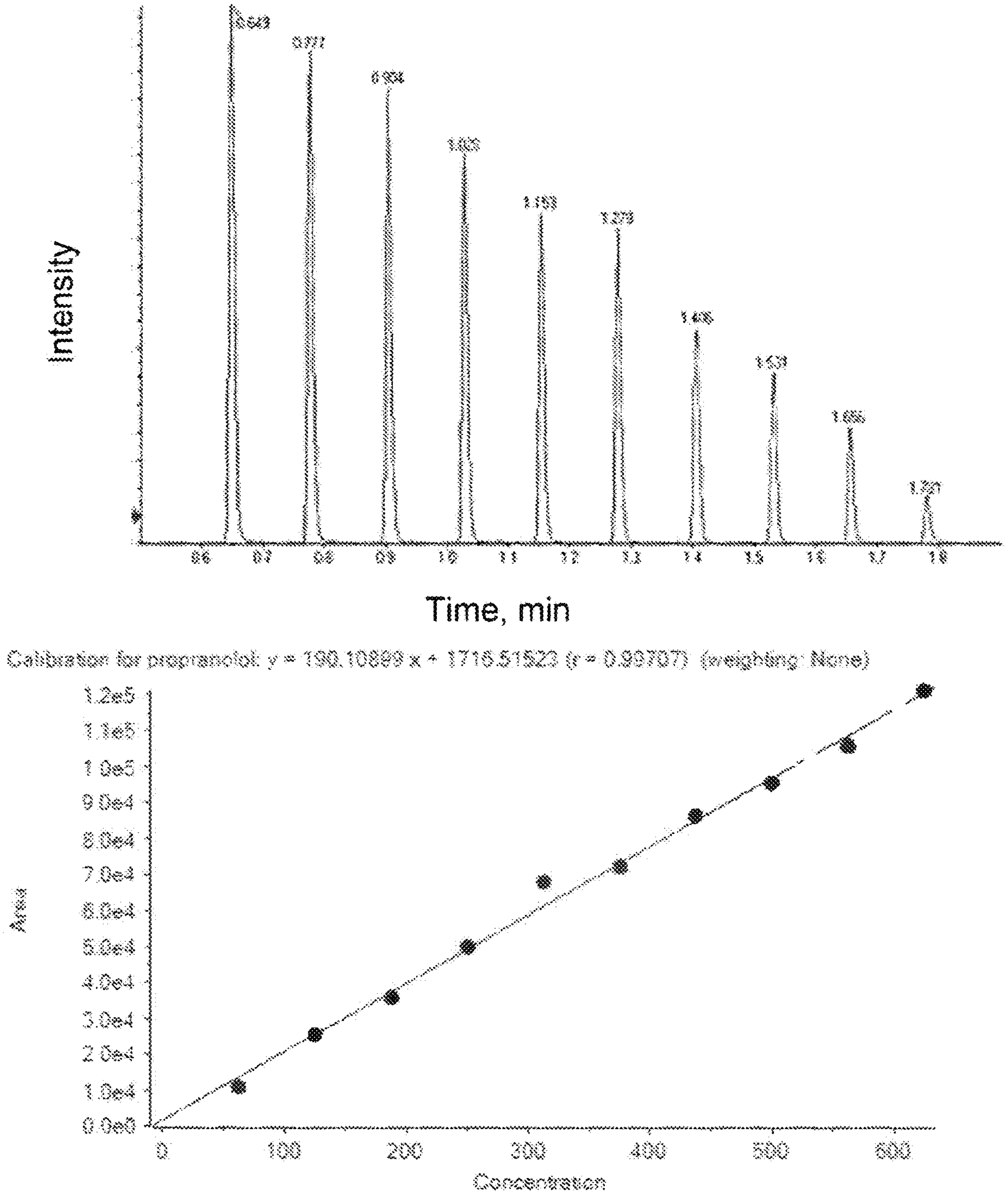
FIG. 20 illustrates an embodiment of a calibration curve.

This invention directly measures the amount of the components of interest by the mass spectrometer without the use of labels. The data and corresponding calibration curve in FIG. 20 demonstrates the inherent quantitative nature of this method. Different amounts of sample injected into the capture probe sample processing region lead to proportionally different signals from which calibration curves can be constructed.

The option is available to use an internal standard to normalize the signals from the sample without adding the internal standard to the sample where it might perturb results. It is added to the transport fluid of the OPP interface. The response ratio between the internal standard and the targeted analytes is initially measured and recorded. This relationship is then used to determine the amount of analyte in a sample where its concentration is unknown. The amount of analyte can be determined without an internal standard in the transport fluid by pre-establishing a calibration curve of mass spec signal versus concentration of analyte and then reading the concentration of unknown samples from that graph.

This apparatus and the method it enables requires no modification to enzymatic or catalytic reactions typically encountered in biology or chemistry. High throughput screening assays against known biological targets, enzyme, receptor, live cell based or otherwise are examples as are the direct analysis of plasma or other biological fluids. Measurements do not require the addition of internal standards to the reaction, and measurements are done directly upon the reactants and/or products without depending on secondary, indirect detection such as is encountered with the use of fluorophores for example.

7. Reaction conditions must remain consistent which means maintaining control over the critical parameter of temperature. Temperature control is commonly used, particularly when careful kinetic measurements are to be made. Each sample well must be maintained at precisely the same temperature as the next to generate meaningful data.

Methods which transfer heat evenly to all wells, for example microtiter plates, have been employed which heat the entire bottom or top of the plate to transfer the heat evenly. In the case of acoustically dispensed wells into an OPP both the top and bottom regions of the plate are occupied by the acoustic transducer on the bottom and OPP on the top. This makes the classical approach toward solving this problem unsuitable.

Figure 11:
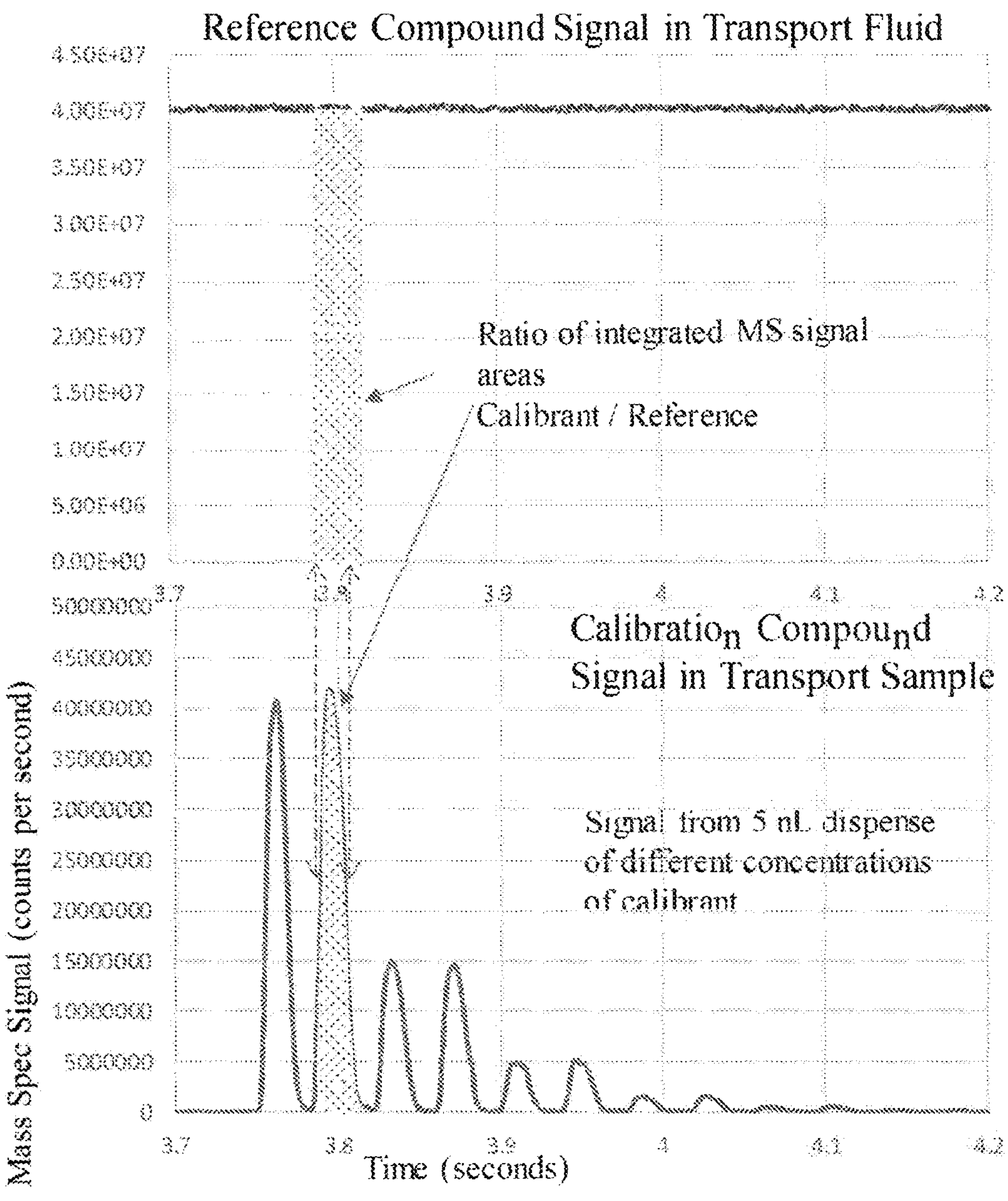
FIG. 11 illustrates signal of a reference compound in a mass spectrometer.

In order to effectively couple the sound waves from the piezoelectric transducer to the bottom of the well plate a liquid medium like water is used to avoid an air gap. Current embodiments of acoustic dispensers all flood the region between the transducer's lens and the bottom of each individual well with a small amount of coupling liquid. An element of this apparatus to solve this problem is to flood the entire bottom of the well plate with the coupling fluid and control the temperature of the fluid. In this way consistently even temperature control, both heating and cooling, can be maintained. This element of the invention is shown in FIG. 11.

The ability to control sample temperature precisely and accurately with acoustic dispensing has benefits beyond kinetic measurements. As described in the calibration section of this provisional patent application, acoustic dispensing parameters are specific to solutions of specific viscosity values. When the viscosity changes so do the dispensing parameters. Holding the temperature constant stabilizing the temperature stabilized the viscosity and thus helps to prevent dispensing parameters from drifting out of calibration Additionally, warming up the samples reduces their viscosity. The maximum viscosity solution that can be dispensed acoustically is approximately 100 cp. The ability to effectively raise the temperature will increase the range of solution types that can be dispensed by reducing the viscosity of those whose viscosity is at the maximum with heat.

8. The type of measurements made on each well must remain flexible, unrestrained, and capable of being rapidly switched from sample to sample. This is because in situ kinetics enables the analysis of large numbers of different reactions at the same time requiring different reactants, products, and cofactors to be monitored. The capability for the analysis of multiple different compounds during the dispensing of each well must be available. For example, changing the compounds monitored for each well of a 96, 384, 1536, or 3456 well microtiter plate because different assays are run in adjacent wells.

Figure 12:
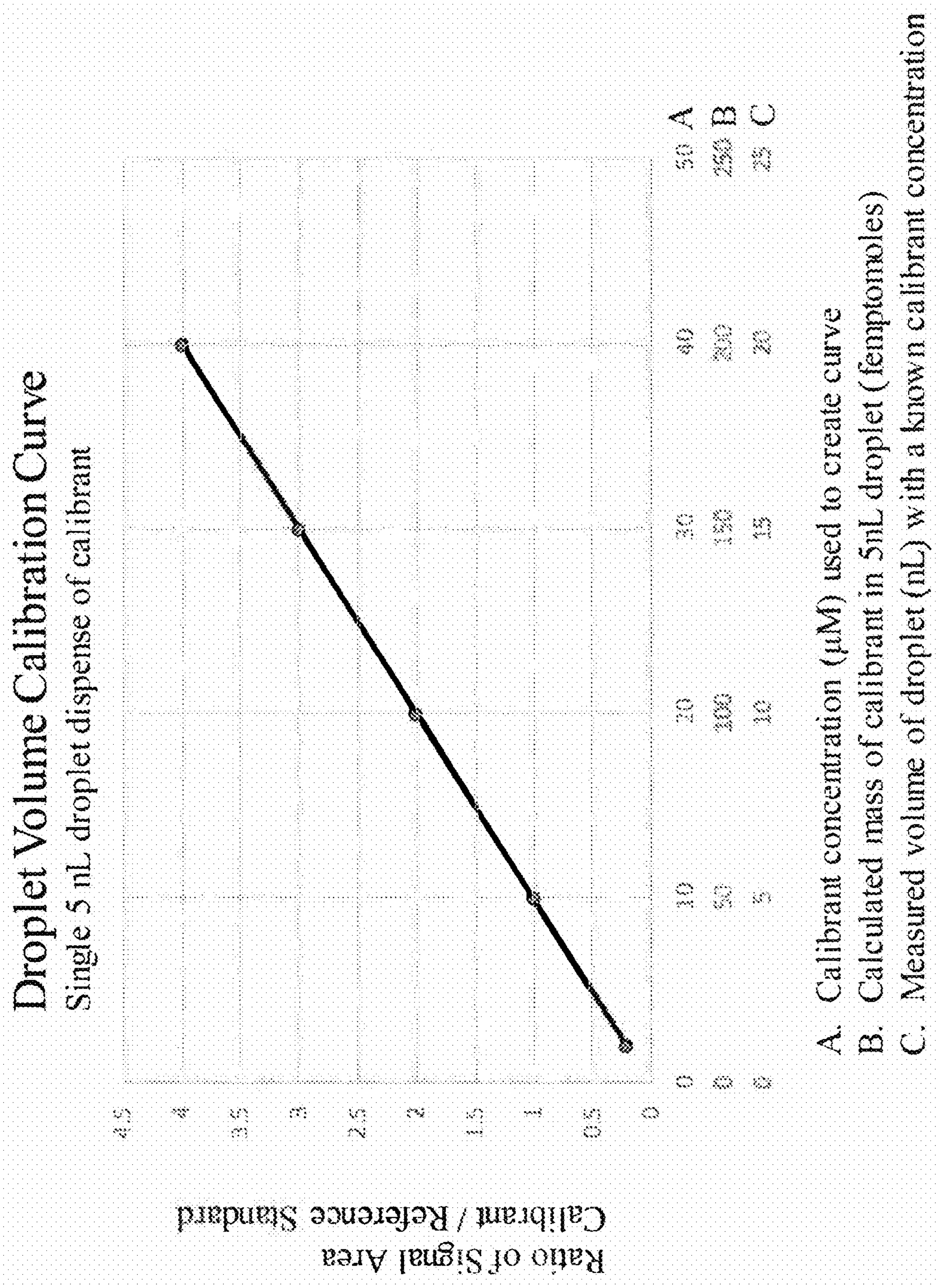
FIG. 12 illustrates another calibration curve.

This method accommodates this requirement by synchronizing the mass being monitored by the mass spectrometer with the well position. This capability also increases the speed of analysis by allowing for some adjacent peak overlap between sample wells if they are judiciously ordered to have a different mass channel monitored in adjacent wells. FIG. 12 is an example of this where peak overlap is occurring but there is no signal interference from adjacent samples because different masses are being monitored. This idea is similar with the technique of "scheduled MRM", which was designed for a chromatographic separation. In our invention, MS data acquisition methods are not synchronized with chromatographic retention time, but the vial positions. Using this method, the data from several samples are acquired in a single data file, typically all samples in a microtiter plate. In addition, faster methods switching speed is required (sub sec resolution).

We claim:

1. A method of monitoring a reaction in situ, comprising:
- providing a reaction well containing a reaction mixture undergoing a reaction;
- dispensing a plurality of droplets from the reaction well at respective time points during the reaction without quenching the reaction;
- ionizing each dispensed droplet; and
- measuring, using a mass spectrometer, an amount of at least one reaction component in each ionized droplet.

2. The method of claim 1, further comprising determining a change in the amount of the at least one reaction component over time based on the measured amounts at the respective time points.

3. The method of claim 1, wherein the at least one reaction component comprises at least one of a reactant and a reaction product.

4. The method of claim 1, further comprising:
- capturing each dispensed droplet with transport fluid from a capture probe; and
- transporting each captured droplet with the transport fluid to an ionization chamber of the mass spectrometer.

5. The method of claim 1, wherein each of the plurality of droplets has a volume of between 1 nL and 20 nL, and the volume of the reaction mixture is in the microliter range.

6. The method of claim 1, wherein dispensing the plurality of droplets is performed in a contact-free manner.

7. The method of claim 1, wherein the plurality of droplets is dispensed from the reaction well at a rate of between 0.01 Hz and 100 Hz.

8. The method of claim 1, wherein the plurality of droplets is dispensed from the reaction well at a rate sufficient to produce a continuous mass spectrometer signal.

9. The method of claim 1, wherein the droplets are dispensed using an acoustic droplet dispenser.

10. The method of claim 1, wherein the capture probe comprises a co-axial open port probe configured to supply a transport fluid through an outer conduit to a sample processing region for capturing each droplet and receive and transport transport fluid and each captured droplet to an electrospray ionization source.

11. The method of claim 1, further comprising introducing a reference compound to the transport fluid of the capture probe, wherein the reference compound is not added to the reaction mixture.

12. The method of claim 1, further comprising:
- providing a plurality of reaction wells each containing a respective reaction mixture undergoing a respective reaction; and
- synchronizing a measurement channel of the mass spectrometer with a position of the respective reaction well from which each droplet is dispensed.

13. A system for in situ kinetic monitoring of a chemical or biochemical reaction, the system comprising:
- a droplet dispenser operative to dispense a plurality of droplets from a reaction well at respective time points while a reaction proceeds in the reaction well;
- a capture probe for receiving and capturing each dispensed droplet with a transport fluid;
- an ionization source for ionizing each captured droplet; and
- a mass spectrometer for measuring an amount of at least one reaction component in each ionized droplet.

14. The system of claim 13, wherein the droplet dispenser comprises an acoustic droplet dispenser operative to dispense the plurality of droplets in a contact-free manner.

15. The system of claim 13, wherein the capture probe comprises a co-axial open port probe (OPP) that supplies transport fluid through an outer conduit to a sample processing region for capturing each droplet and receives and transports transport fluid and each captured droplet to an electrospray ionization source.

16. The system of claim 13, further comprising a reference compound of known concentration introduced into the transport fluid of the capture probe.

17. The system of claim 13, further operative to determine a change in the amount of the at least one reaction component over time based on the measured amounts at the respective time points.

* * * * *